(12) United States Patent
Amasaki et al.

(10) Patent No.: US 8,044,123 B2
(45) Date of Patent: Oct. 25, 2011

(54) ULTRAVIOLET ABSORBER COMPOSITION AND RESIN COMPOSITION

(75) Inventors: Ichiro Amasaki, Ashigarakami-gun (JP); Keizo Kimura, Ashigarakami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/820,663

(22) Filed: Jun. 22, 2010

(65) Prior Publication Data

US 2010/0324181 A1    Dec. 23, 2010

(30) Foreign Application Priority Data

Jun. 23, 2009    (JP) ................ 2009-149104

(51) Int. Cl.
| C08K 5/00 | (2006.01) |
| C08K 5/16 | (2006.01) |
| C08K 5/34 | (2006.01) |
| C08K 5/35 | (2006.01) |
| C08K 5/3435 | (2006.01) |
| C08K 5/3492 | (2006.01) |
| C09K 15/22 | (2006.01) |
| F21V 9/06 | (2006.01) |

(52) U.S. Cl. .............. 524/100; 524/91; 524/96; 524/99; 524/102; 524/208; 524/359; 252/403; 252/589

(58) Field of Classification Search ............. 524/91, 524/96, 99, 100, 102, 208, 359; 252/403, 252/589
See application file for complete search history.

(56) References Cited

U.S. PATENT DOCUMENTS

| 6,225,468 | B1 | 5/2001 | Gupta et al. | |
| 6,867,250 | B1 * | 3/2005 | Gupta et al. ................ | 524/100 |
| 2003/0146412 | A1 * | 8/2003 | Gupta et al. ................ | 252/380 |
| 2004/0013619 | A1 * | 1/2004 | Reinehr et al. ............ | 424/59 |
| 2010/0004439 | A1 * | 1/2010 | Amasaki et al. ............ | 544/92 |

FOREIGN PATENT DOCUMENTS

| EP | 1 213 283 A2 | 6/2002 |
| EP | 1 310 492 A1 | 5/2003 |
| JP | 5-339033 A | 12/1993 |
| JP | 5-345639 A | 12/1993 |
| JP | 6-056466 A | 3/1994 |
| JP | 2002-524452 A | 8/2002 |
| JP | 2008-273927 | 11/2008 |
| WO | WO 01/57124 | 8/2001 |
| WO | WO 02/28854 | 4/2002 |
| WO | WO 02/36579 | 5/2002 |

OTHER PUBLICATIONS

Brunetti et al.: "Die Synthese Von Asymmetrisch Substituierten Omicron-hydroxyphenyl-Sigma-Triazinen", Helvetica Chimica Acta, Verlag Helvetica Chimica Acta, Basel, CH Jan. 1, 1972, pp. 1566-1595, vol. 55, No. 1, XP002034121, ISSN: 0018-019X, with English abstract.
Corwin Hansche et al.: "A Survey of Hammett Substituent Constants and Resonance and Field Parameters", Chemical Reviews, ACS, Jan. 1, 1991, pp. 165-195, vol. 91, Washington, DC, US, XP002447343, ISSN: 0009-2665.
Search Report from European Patent Office issued in Applicant's corresponding European Application No. 10166801.0 dated Aug. 20, 2010.

* cited by examiner

*Primary Examiner* — Kriellion Sanders
(74) *Attorney, Agent, or Firm* — Buchanan Ingersoll & Rooney PC

(57) ABSTRACT

An ultraviolet absorber composition is provided and includes: a compound represented by formula (I); and an ultraviolet absorber having a maximum absorption at a wavelength of from 340 to 400 nm:

$R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ each independently represent a hydrogen atom or a monovalent substituent except OH, or adjacent two of $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ may be taken together to form a ring; $R^{1k}$, $R^{1m}$, $R^{1n}$, and $R^{1p}$ each independently represent a hydrogen atom or a monovalent substituent, or adjacent two of $R^{1k}$, $R^{1m}$, $R^{1n}$, and $R^{1p}$ may be taken together to form a ring; and at least one of $R^{1a}$, $R^{1b}$, $R^{1c}$, $R^{1d}$, $R^{1e}$, $R^{1f}$, $R^{1g}$, $R^{1h}$, $R^{1i}$, $R^{1j}$, $R^{1k}$, $R^{1m}$, $R^{1n}$, and $R^{1p}$ is a substituent having a positive σp value in Hammett equation.

12 Claims, No Drawings

ULTRAVIOLET ABSORBER COMPOSITION AND RESIN COMPOSITION

This application is based on and claims priority under 35 U.S.C. §119 from Japanese Patent Application No. 2009-149104 filed Jun. 23, 2009, the entire disclosure of which is herein incorporated by reference.

BACKGROUND OF THE INVENTION

1. Field of the Invention

This invention relates to an ultraviolet (UV) absorber composition and a resin composition.

2. Background Art

A UV absorber has been used in combination with various resins to impart UV absorbing properties to the resins. UV absorbers include inorganic UV absorbers and organic UV absorbers. Inorganic UV absorbers, such as disclosed in JP-A-5-339033, JP-A-5-345639, and JP-A-6-56466, are excellent in durability including weatherability and heat resistance but provide limited choice because the absorption wavelengths depend on the band gap of the compound. No inorganic UV absorbers are capable of absorbing long wavelength UV light called UV-A irradiation having wavelengths around 400 nm, or inorganic UV absorbers capable of absorbing UV-A irradiation also absorb visible light and are therefore accompanied by coloration.

On the other hand, organic UV absorbers offer broad freedom of design of their structure. Hence, organic UV absorbers having various ranges of absorption wavelengths are provided through structural design.

A variety of organic UV absorbers have thus been studied. For example, JP-T-2002-524452 discloses triazole UV absorbers, of which those having an absorption maximum in the UV-A region have poor light resistance and reduce in UV light shielding effect with time.

To address this problem, it has been proposed to use a combination containing a UV absorber having UV light shielding effect in the UV-A region. It is considered that combining a certain UV absorber that is incapable of absorbing a certain UV wavelength region with another UV absorber will provide a UV absorber composition capable of absorbing the whole UV region and also capable of effectively shielding the UV-A region. A primary problem with this approach is that a composition containing UV absorbers different in basic skeleton exhibits poor compatibility with a polymer matrix, often resulting in bleeding or poor solubility in a solvent, which can cause deterioration of the operational efficiency. Another problem is that the differences between the combined UV absorbers in UV shielding effect or rate of degradation with time can cause a failure to obtain sufficient UV shielding effect over the whole UV region.

It has therefore been demanded to develop a UV absorber composition that settles down the above discussed problems and exhibits excellent light resistance even in the UV-A region.

SUMMARY OF THE INVENTION

An object of an illustrative, non-limiting embodiment of the invention is to provide a UV absorber composition having excellent UV shielding effect even in an UV-A region. Another object of an illustrative, non-limiting embodiment of the invention is to provide a UV absorber composition and a resin composition that maintain UV-A shielding effect for a prolonged period of time, which compositions will impart improved UV light resistance to, for example, polymer materials. Such polymer materials with improved UV light resistance may be formed into a UV filter that will suppress decomposition of other UV-labile compounds.

The present inventors have intensively studied heterocyclic compounds and found, as a result, a UV absorber composition and a resin composition that have high light fastness and excellent UV shielding effect in the UV-A region that has been difficult to absorb by conventional UV absorbers. The present invention has thus been reached based on this finding.

The object of the invention can be accomplished by the following constitution.

[1] An ultraviolet absorber composition comprising: a compound represented by formula (I); and an ultraviolet absorber having a maximum absorption at a wavelength of from 340 to 400 nm:

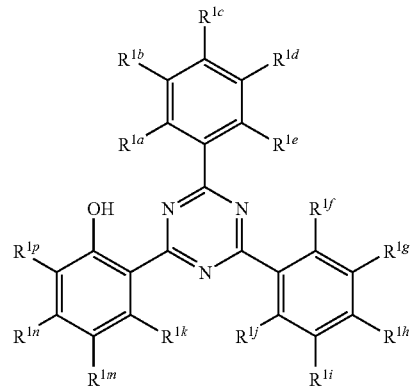

wherein $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ each independently represent a hydrogen atom or a monovalent substituent except OH, or adjacent two of $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ may be taken together to form a ring; $R^{1k}$, $R^{1m}$, $R^{1n}$, and $R^{1p}$ each independently represent a hydrogen atom or a monovalent substituent, or adjacent two of $R^{1k}$, $R^{1m}$, $R^{1n}$, and $R^{1p}$ may be taken together to form a ring; and at least one of $R^{1a}$, $R^{1b}$, $R^{1c}$, $R^{1d}$, $R^{1e}$, $R^{1f}$, $R^{1g}$, $R^{1h}$, $R^{1i}$, $R^{1j}$, $R^{1k}$, $R^{1m}$, $R^{1n}$, and $R^{1p}$ and $R^{1p}$ is a substituent having a positive σp value in Hammett equation.

[2] The ultraviolet absorber composition according to item [1], wherein at least one of $R^{1a}$, $R^{1b}$, $R^{1c}$, $R^{1d}$, and $R^{1e}$ is a substituent having a positive σp value in Hammett equation.

[3] The ultraviolet absorber composition according to item [1] or [2], wherein $R^{1c}$ is a substituent having a positive σp value in Hammett equation.

[4] The ultraviolet absorber composition according to any one of items [1] to [3], wherein the positive σp value in Hammett equation is from 0.1 to 1.2.

[5] The ultraviolet absorber composition according to any one of items [1] to [4], wherein the substituent having a positive σp value in Hammett equation is a group selected from $COOR^r$, $CONR^s_2$, $CN$, $CF_3$, a halogen atom, $NO_2$, $SO_2R^t$, and $SO_3M$, wherein $R^r$, $R^s$, and $R^t$ each represent a hydrogen atom or a monovalent substituent and M represents a hydrogen atom or an alkali metal.

[6] The ultraviolet absorber composition according to any one of items [1] to [5], wherein the substituent having a positive σp value in Hammett equation is $COOR^r$, wherein $R^r$ represents a hydrogen atom or a monovalent substituent.

[7] The ultraviolet absorber composition according to any one of items [1] to [6], wherein $R^{1c}$ is CN.

[8] The ultraviolet absorber composition according to any one of items [1] to [7], wherein $R^{1n}$ is $OR^u$, wherein $R^u$ represents a hydrogen atom or a monovalent substituent.
[9] The ultraviolet absorber composition according to item [8], wherein $R^u$ is an alkyl group having 1 to 20 carbon atoms.
[10] The ultraviolet absorber composition according to any one of items [1] to [9], wherein the ultraviolet absorber having a maximum absorption at a wavelength of from 340 to 400 nm is at least one compound selected from a benzotriazole compound, a benzophenone compound, a benzoxazinone compound, a cyanoacrylate compound, a benzoxazole compound, a merocyanine compound, and a triazine compound.
[11] The ultraviolet absorber composition according to any one of items [1] to [10], wherein the ultraviolet absorber having a maximum absorption at a wavelength of from 340 to 400 nm is a benzoxazinone compound.
[12] A resin composition comprising: a compound represented by formula (I) described in any one of items [1] to [11]; and an ultraviolet absorber having a maximum absorption at a wavelength of from 340 to 400 nm described in any one of items [1] to [11].

DETAILED DESCRIPTION OF THE INVENTION

An UV absorber composition and a resin composition according to an exemplary embodiment of the invention exhibit high light fastness even in the UV-A region. A resin molding compound containing a compound of the invention provides polymer molded articles, such as plastics and fibers, with increased photostability.

An UV absorber composition according to an exemplary embodiment of the invention contains a compound represented by formula (I) (hereinafter referred to as a compound (I)) and a UV absorber having maximum absorption at a wavelength of from 340 to 400 nm.

The compound (I) that can be used in an UV absorber composition of the invention is characterized by having a short excitation duration and therefore exhibiting very high light resistance because of its substituent having a positive σp value in Hammett equation at a specific position. A UV absorber composition containing a known triazine compound has a problem that the absorptivity degrades with time on account of low light resistance of the triazine compound. In contrast, because the compound (I) has high light resistance, using a small amount of the compound (I) produces sufficient UV light shielding effect.

Combining the compound (I) with a UV absorber having a maximum absorption wavelength in a range of from 340 to 400 nm imparts increased light resistance to the UV absorber. As a result, the UV absorber composition is able to retain the UV shielding effect even in prolonged use.

(Compound Represented by Formula (I))

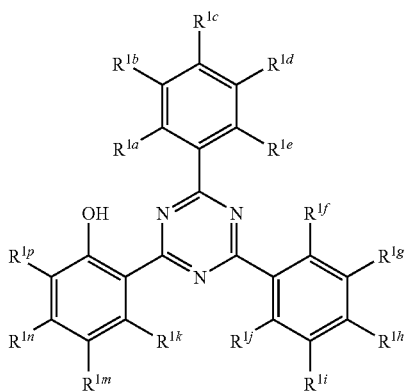

In formula (I), $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ each independently represent a hydrogen atom or a monovalent substituent except OH, or adjacent two of $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ may be taken together to form a ring; $R^{1k}$, $R^{1m}$, $R^{1n}$, and $R^{1p}$ each independently represent a hydrogen atom or a monovalent substituent, or adjacent two of $R^{1k}$, $R^{1m}$, $R^{1n}$, and $R^{1p}$ may be taken together to form a ring; and at least one of $R^{1a}$, $R^{1b}$, $R^{1c}$, $R^{1d}$, $R^{1e}$, $R^{1f}$, $R^{1g}$, $R^{1h}$, $R^{1i}$, $R^{1j}$, $R^{1k}$, $R^{1m}$, $R^{1n}$, and $R^{1p}$ is a substituent having a positive σp value in Hammett equation.

While at least one of $R^{1a}$, $R^{1b}$, $R^{1c}$, $R^{1d}$, $R^{1e}$, $R^{1f}$, $R^{1g}$, $R^{1h}$, $R^{1i}$, $R^{1j}$, $R^{1k}$, $R^{1m}$, $R^{1n}$, and $R^{1p}$ is a substituent having a positive σp value in Hammett equation, it is preferred that at least one of $R^{1a}$, $R^{1b}$, $R^{1c}$, $R^{1d}$, and $R^{1e}$ is a substituent having a positive σp value in Hammett equation.

It is preferred that one to three of $R^{1a}$, $R^{1b}$, $R^{1c}$, $R^{1d}$, $R^{1e}$, $R^{1f}$, $R^{1g}$, $R^{1h}$, $R^{1i}$, $R^{1j}$, $R^{1k}$, $R^{1m}$, $R^{1n}$, and $R^{1p}$ be a substituent or substituents having a positive σp value in Hammett equation. It is more preferred that one or two of $R^{1a}$, $R^{1b}$, $R^{1c}$, $R^{1d}$, $R^{1e}$, $R^{1f}$, $R^{1g}$, $R^{1h}$, $R^{1i}$, $R^{1j}$, $R^{1k}$, $R^{1m}$, $R^{1n}$, and $R^{1p}$ be a substituent or substituents having a positive σp value in Hammett equation.

It is preferred that at least one of $R^{1a}$, $R^{1c}$, $R^{1e}$, $R^{1f}$, $R^{1h}$, $R^{1j}$, $R^{1k}$, and $R^{1n}$ be a substituent having a positive σp value in Hammett equation. It is more preferred that $R^{1c}$ be a substituent having a positive σp value in Hammett equation. It is even more preferred that $R^{1c}$ be a substituent having a positive σp value in Hammett equation and that $R^{1a}$, $R^{1b}$, $R^{1d}$, and $R^{1e}$ be each a hydrogen atom.

Where $R^{1c}$ is a substituent having a positive σp value in Hammett equation, the LUMO is stabilized by this electron attracting substituent. As a result, the excitation duration is shortened, and the light resistance increases.

Examples of the monovalent substituent in formula (I) include halogen atoms (e.g., F, Cl, Br, and I), alkyl groups having 1 to 20 carbon atoms (e.g., methyl or ethyl), cycloalkyl groups having 5 to 10 carbon atoms (e.g., cyclopentyl or cyclohexyl), aryl groups having 6 to 20 carbon atoms (e.g., phenyl or naphthyl), a cyano group, a carboxyl group, alkoxycarbonyl groups (e.g., methoxycarbonyl), aryloxycarbonyl groups (e.g., phenoxycarbonyl), substituted or unsubstituted carbamoyl groups (e.g., carbamoyl, N-phenylcarbamoyl, or N,N-dimethylcarbamoyl), alkylcarbonyl groups (e.g., acetyl), arylcarbonyl groups (e.g., benzoyl), a nitro group, substituted or unsubstituted amino groups (e.g., amino, dimethylamine, or anilino), acylamino groups (e.g., acetamide or ethoxycarbonylamino), sulfonamide groups (e.g., methanesulfonamide), imide groups (e.g., succinimide or phthalimide), imino groups (e.g., benzylideneamino), a hydroxyl group, alkoxy groups having 1 to 20 carbon atoms (e.g., methoxy), aryloxy (e.g., phenoxy), acyloxy groups (e.g., acetoxy), alkylsulfonyloxy groups (e.g., methanesulfonyloxy), arylsulfonyloxy groups (e.g., benzenesulfonyloxy), a sulfo group, substituted or unsubstituted sulfamoyl groups (e.g., sulfamoyl or N-phenylsulfamoyl), alkylthio groups (e.g., methylthio), arylthio groups (e.g., phenylthio), alkylsulfonyl groups (e.g., methanesulfonyl), arylsulfonyl groups (e.g., benzenesulfonyl), and heterocyclic groups having 6 to 20 carbon atoms (e.g., pyridyl or morpholino). The substituents enumerated above will hereinafter be referred to as substituents A.

The substituents A may further be substituted with one or more substituents which may be the same or different, may be taken together to form a ring, and may be chosen from the substituents A.

The monovalent substituent in formula (I) is preferably $OR^u$ (wherein $R^u$ is hydrogen or a monovalent substituent), alkyl or amide, more preferably $OR^u$ or alkyl.

$R^u$ represents hydrogen or a monovalent substituent. Examples of the monovalent substituent include the substituents A. $R^u$ is preferably a straight-chain or branched alkyl group having 1 to 20 carbon atoms, more preferably a straight-chain or branched alkyl group having 1 to 6 carbon atoms. Examples of the straight-chain or branched alkyl group having 1 to 6 carbon atoms are methyl, ethyl, n-propyl, isopropyl, n-butyl, isobutyl, sec-butyl, tert-butyl, and n-octyl, with methyl and ethyl being preferred. Methyl is more preferred.

Of the compounds (1) preferred are those in which $R^{1n}$ is a monovalent substituent, particularly $OR^u$. It is more preferred that $R^{1n}$ be $OR^u$ and that each of $R^{1k}$, $R^{1m}$, and $R^{1p}$ be hydrogen because the molar absorptivity increases to provide enhanced shielding effect.

The substituent having a positive σp value in Hammett equation in formula (I) is an electron attracting group preferably having a σp value of 0.1 to 1.2. Examples of an electron attracting group having a σp value of 0.1 or greater include $COOR^r$ (wherein $R^r$ is hydrogen or a monovalent substituent), $CONR^s_2$ (wherein each $R^s$ is independently hydrogen or a monovalent substituent), CN, a halogen atom, $NO^2$, $SO_2R^t$ (wherein $R^t$ is hydrogen or a monovalent substituent), $SO_3M$ (wherein M is hydrogen or alkali metal), acyl, formyl, acyloxy, acylthio, alkyloxycarbonyl, aryloxycarbonyl, dialkylphosphono, diarylphosphono, dialkylphosphinyl, diarylphosphinyl, phosphoryl, alkylsulfinyl, arylsulfinyl, acylthio, sulfamoyl, a thiocyanate group, thiocarbonyl, imino, N-substituted imino, carboxyl (or its salt), alkyl substituted with at least two halogen atoms (e.g., $CF_3$), alkoxy substituted with at least two halogen atoms, aryloxy substituted with at least two halogen atoms, acylamino, alkylamino substituted with at least two halogen atoms, alkylthio substituted with at least two halogen atoms, aryl substituted with another electron attracting group having a σp value of 0.2 or more, a heterocyclic group, halogen atom, azo, and a selenocyanate group. For the details of σp value in Hammett equation, reference may be made to Hansch, C., Leo, A., Taft, R. W., Chem. Rev., 91, pp. 165-195 (1991).

The substituent having a positive σp value in Hammett equation in formula (I) is more preferably $COOR^r$, $CONR^s_2$, CN, $CF_3$, halogen atom, $NO^2$, $SO_2R^t$, or $SO_3M$, even more preferably $COOR^r$ or CN, most preferably $COOR^r$. The compound (I) having the preferred substituent having a positive σp value in Hammett equation exhibits excellent light resistance and solubility.

$R^r$ is a hydrogen atom or a monovalent substituent. Examples of the monovalent substituent include the substituents A. $R^r$ is preferably a straight chain or branched alkyl group having 1 to 20 carbon atoms, more preferably a straight chain or branched alkyl group having 1 to 6 carbon atoms. Examples of the straight-chain or branched alkyl group having 1 to 6 carbon atoms are methyl, ethyl, n-propyl, isopropyl, n-butyl, isobutyl, sec-butyl, tert-butyl, and n-octyl, with methyl and ethyl being preferred. Methyl is more preferred.

In formula (I), $R^{1c}$ is preferably $COOR^r$, $CONR^s_2$, CN, $CF_3$, halogen, $NO_2$, $SO_2R^t$, or $SO_3M$, more preferably $COOR^r$ or CN.

It is more preferred that at least one of $R^{1f}$, $R^{1g}$, $R^{1h}$, $R^{1i}$, $R^{1j}$, $R^{1k}$, $R^{1m}$, $R^{1n}$, and $R^{1p}$ be a substituent having a positive σp value in Hammett equation. It is even more preferred that at least one of $R^{1f}$, $R^{1g}$, $R^{1h}$, $R^{1i}$, and $R^{1j}$ be a substituent having a positive σp value in Hammett equation. It is particularly preferred that at least $R^{1h}$ be a substituent having a positive σp value in Hammett equation. It is most preferred that both $R^{1c}$ and $R^{1h}$ be a substituent having a positive σp value in Hammett equation in view of excellent light resistance of the compound (I).

Specific examples of the compound (I) include, but are not limited to, the following compounds.

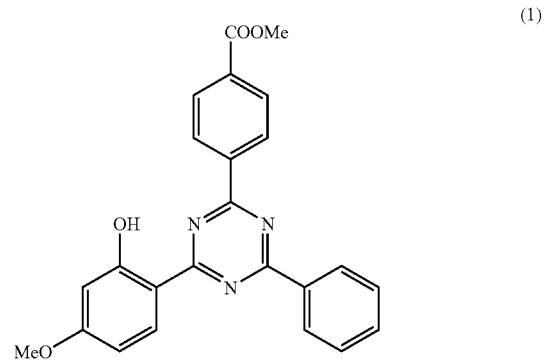

(1)

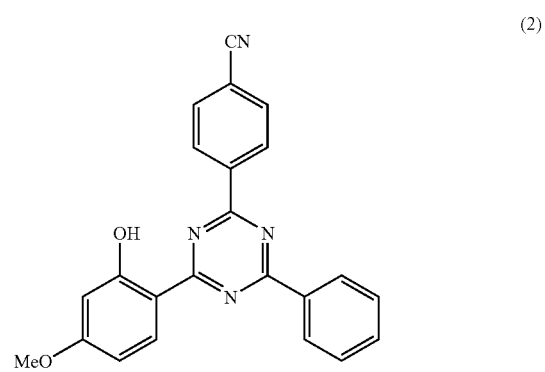

(2)

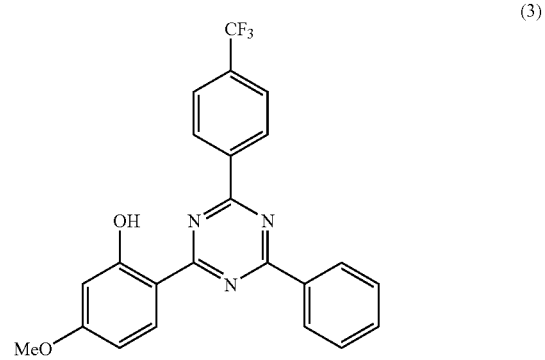

(3)

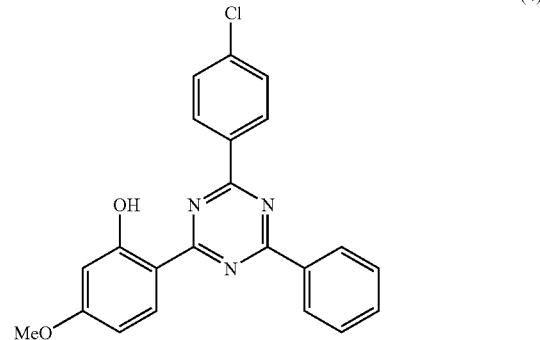

(4)

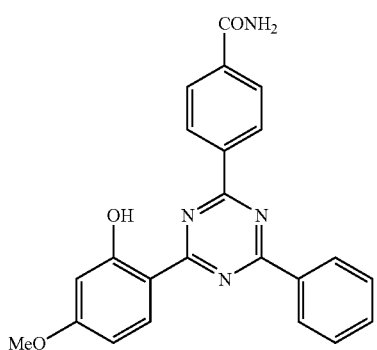
(5)
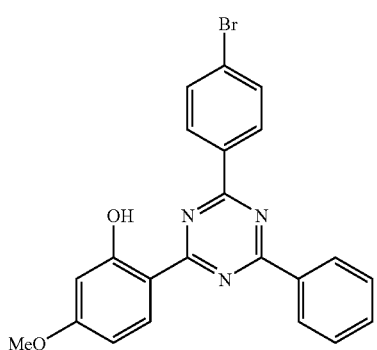
(6)
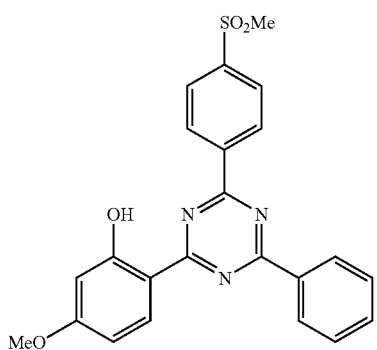
(7)
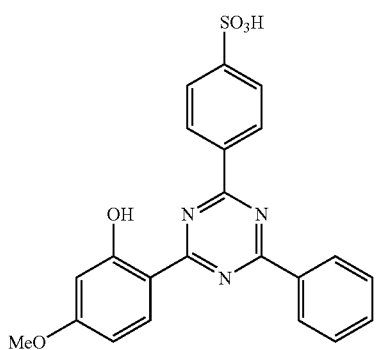
(8)
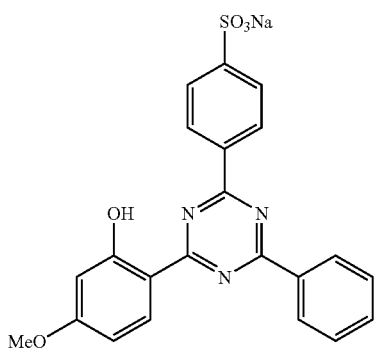
(9)
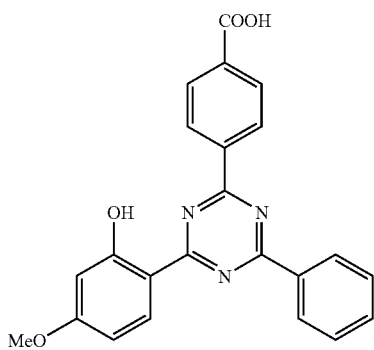
(10)
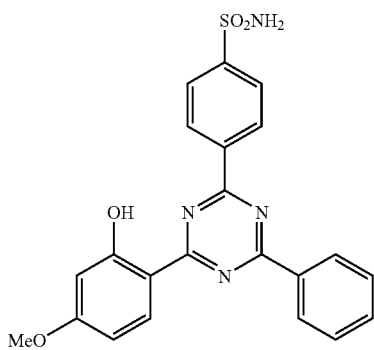
(11)
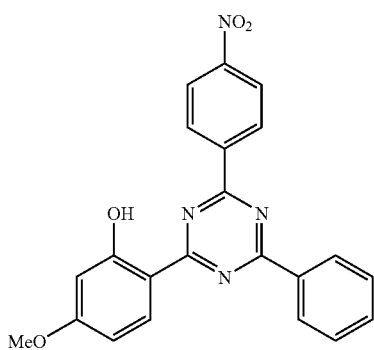
(12)

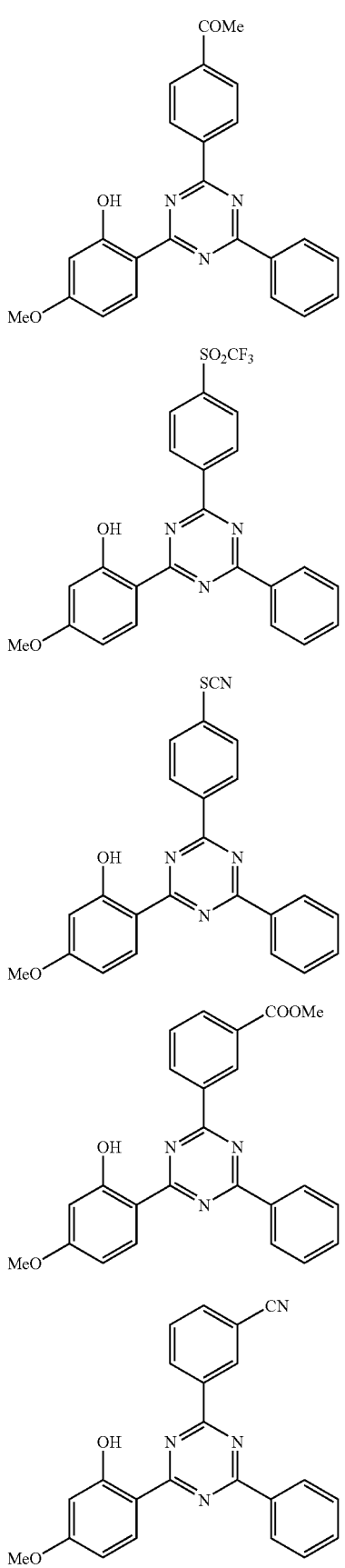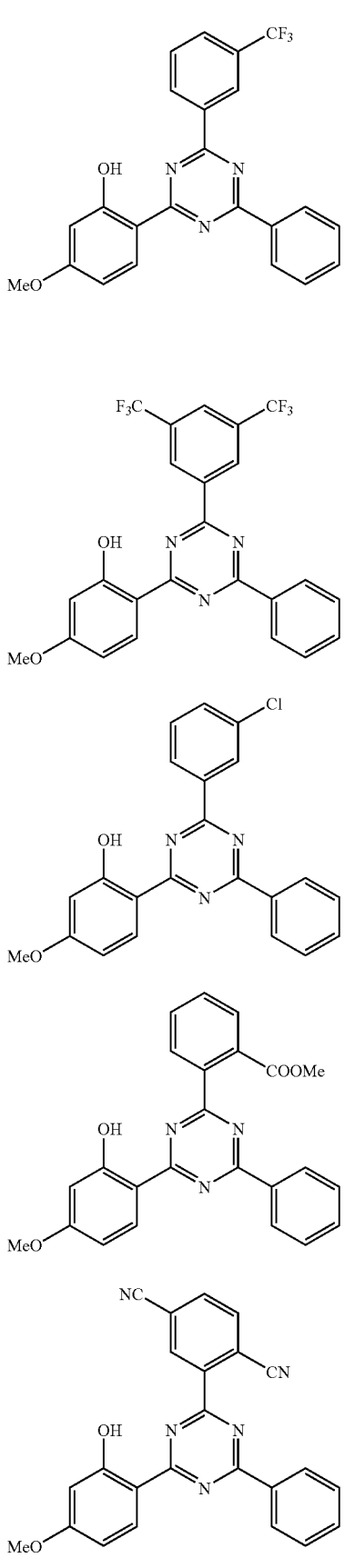

-continued
(23)
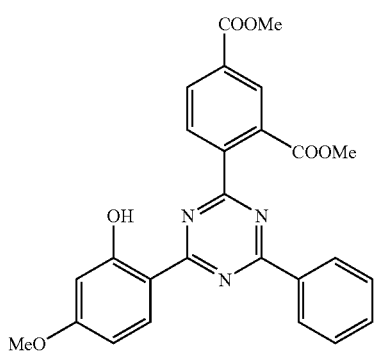
(24)
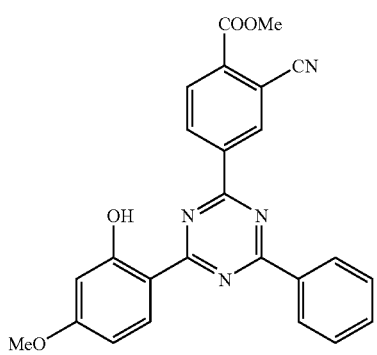
(25)
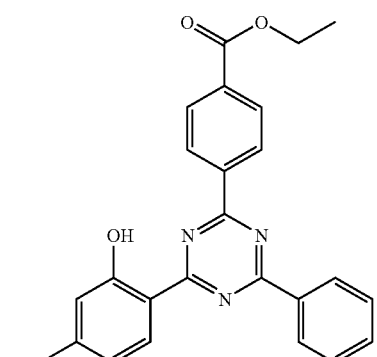
(26)
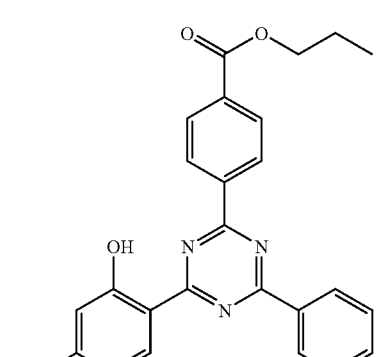
-continued
(27)
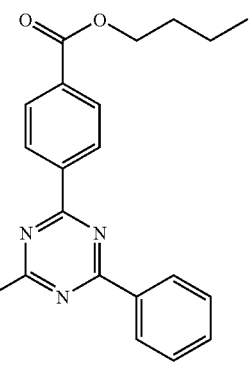
(28)
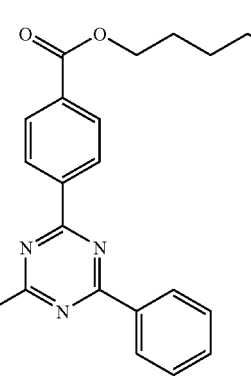
(29)
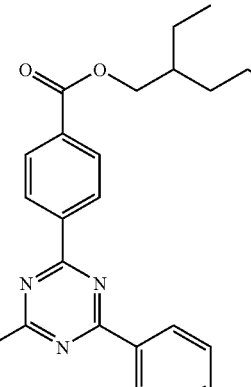
(30)
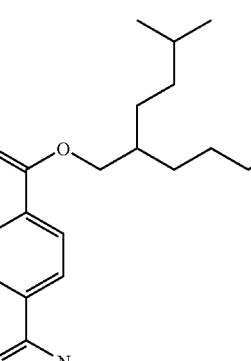
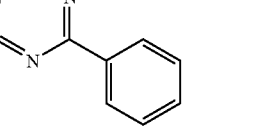

(31)
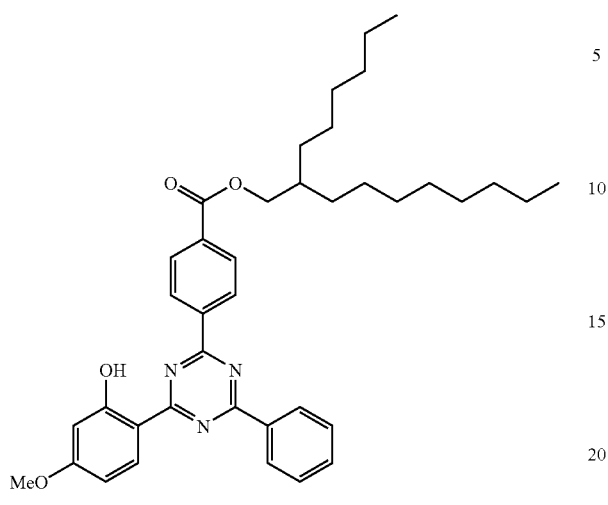
(34)
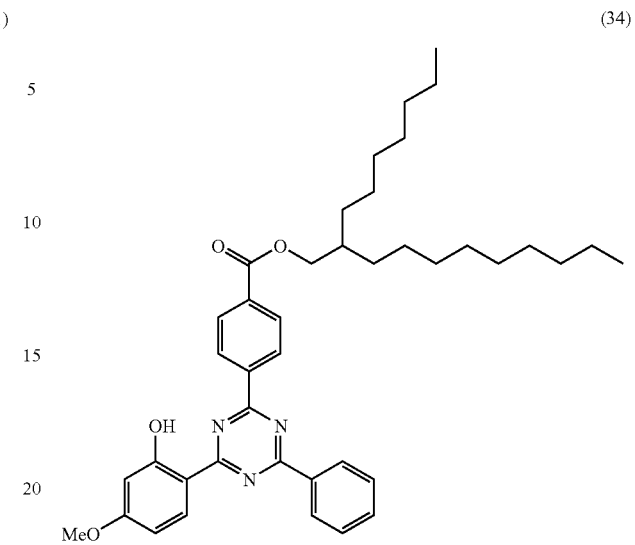
(32)
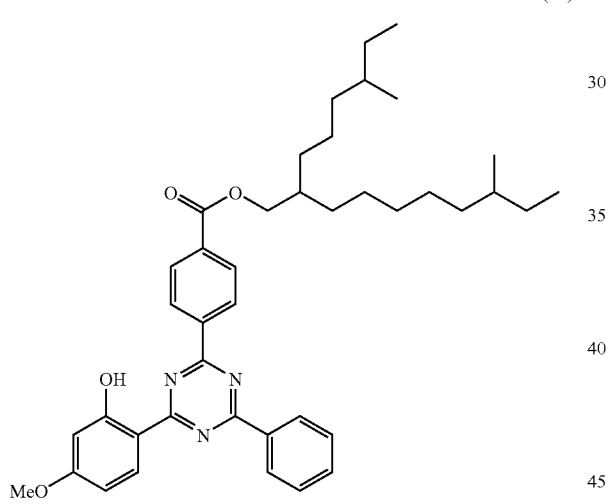
(35)
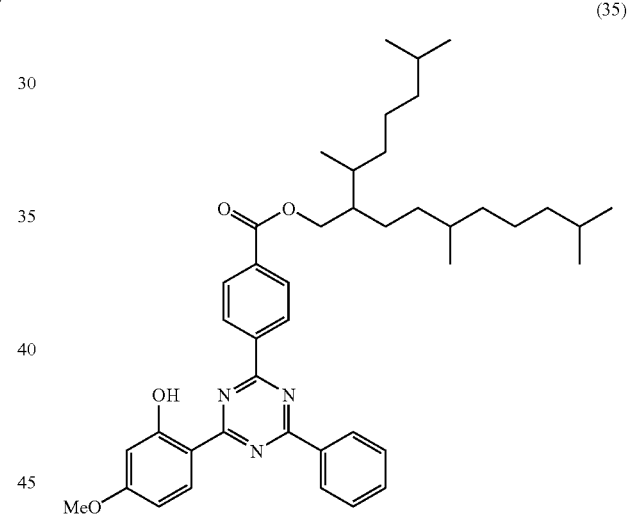
(33)
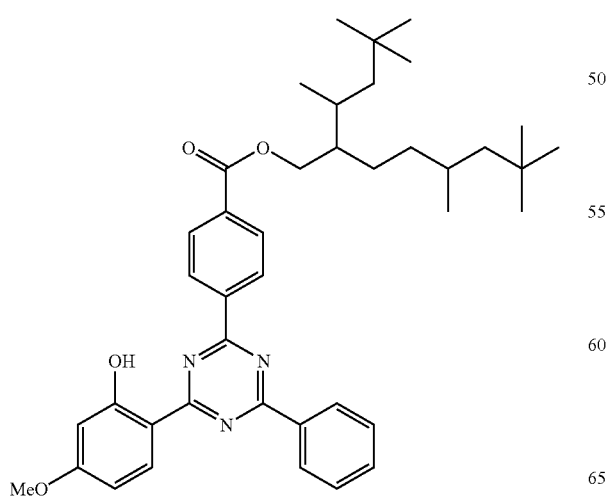
(36)
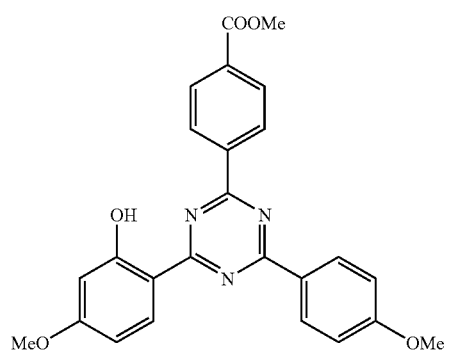

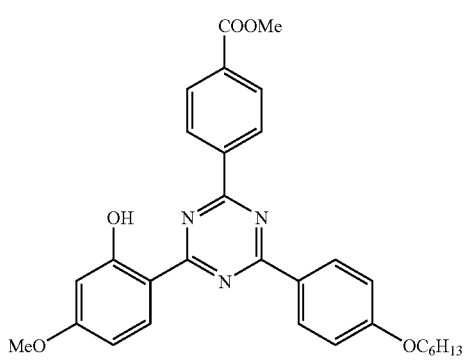
(37)
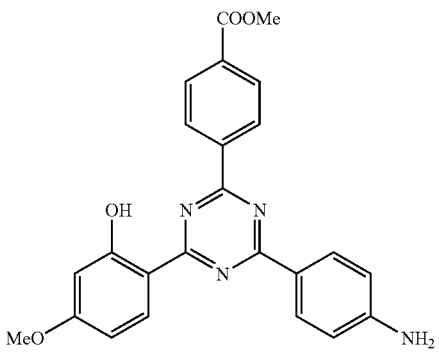
(41)
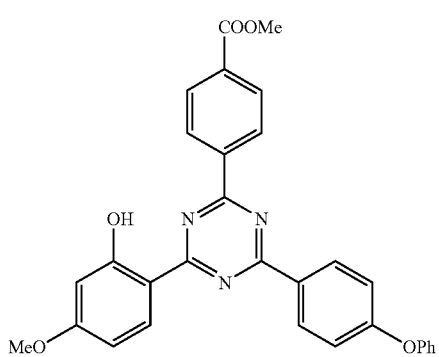
(38)
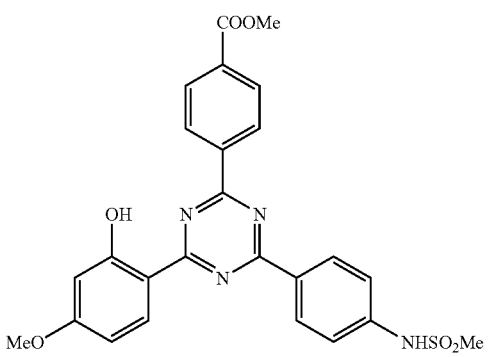
(42)
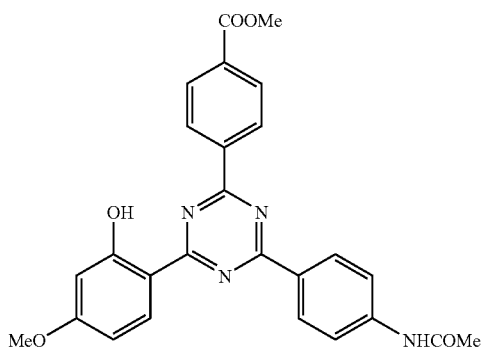
(39)
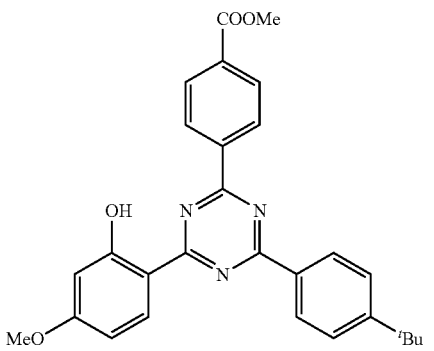
(43)
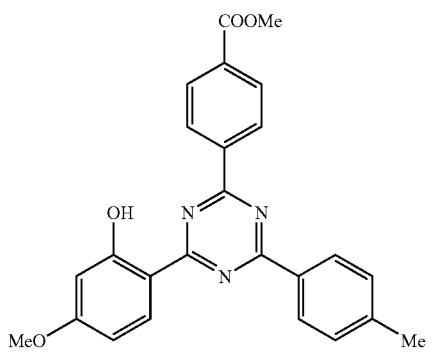
(40)
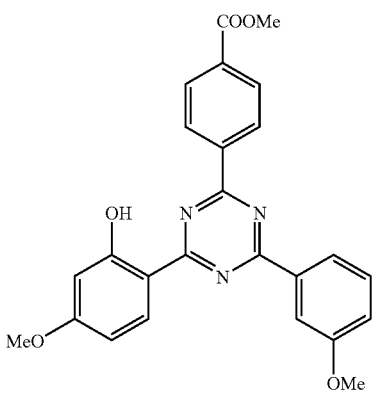
(44)

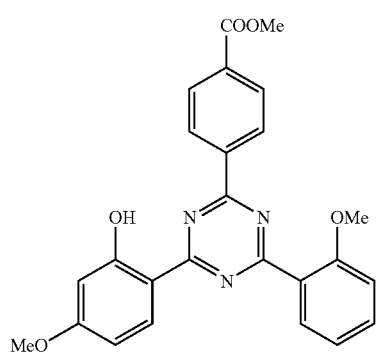
(45)
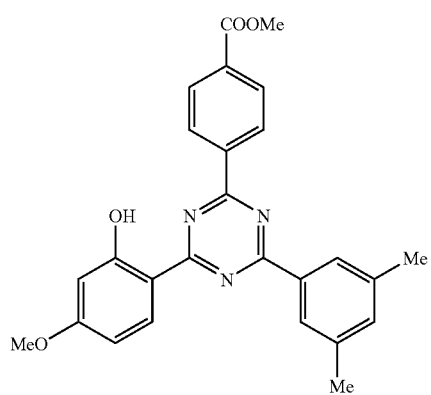
(46)
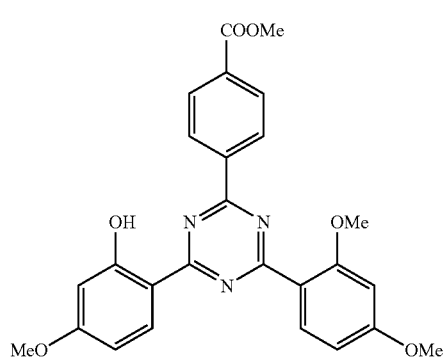
(47)
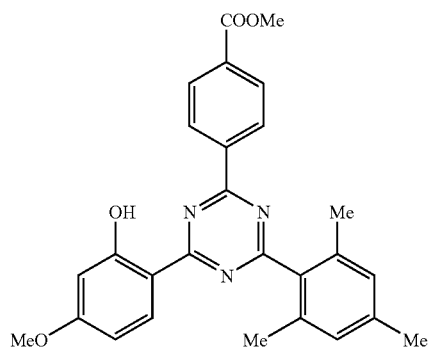
(48)
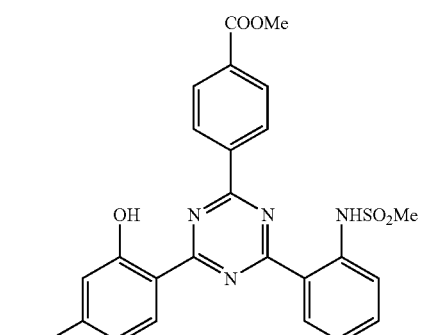
(49)
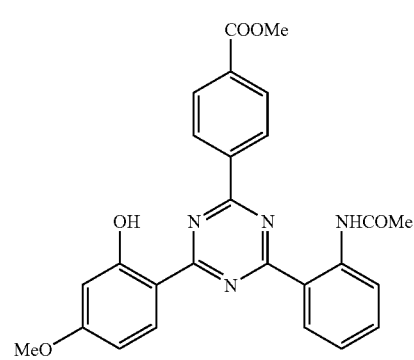
(50)
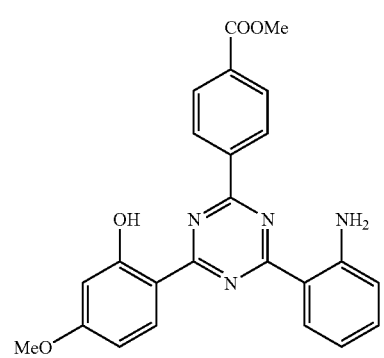
(51)
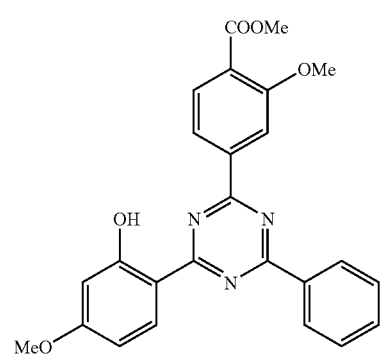
(52)

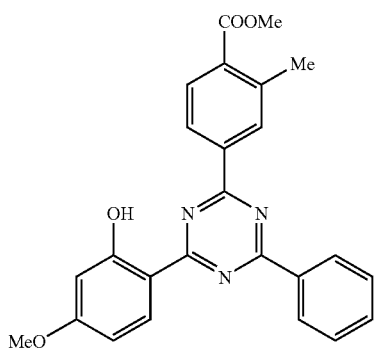 (53)
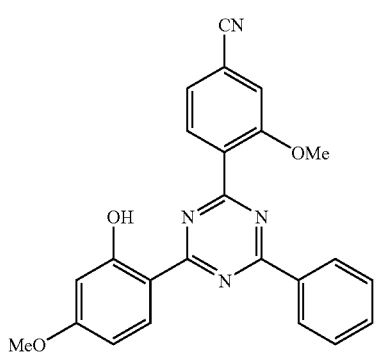 (54)
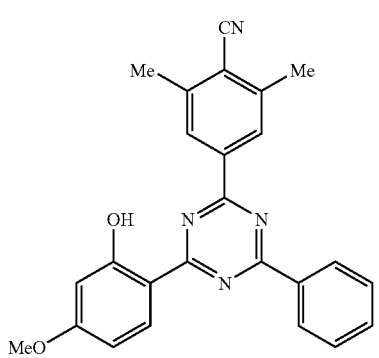 (55)
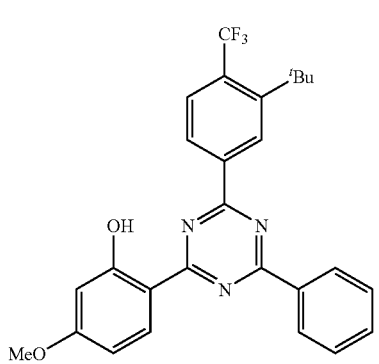 (56)
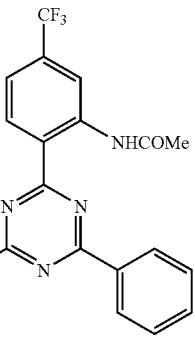 (57)
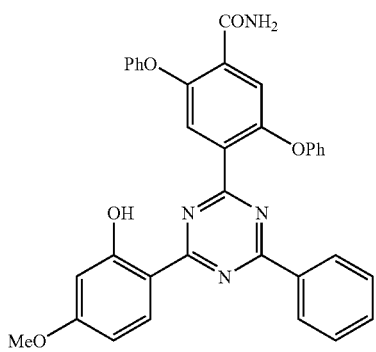 (58)
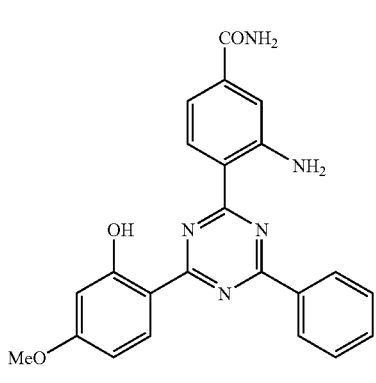 (59)
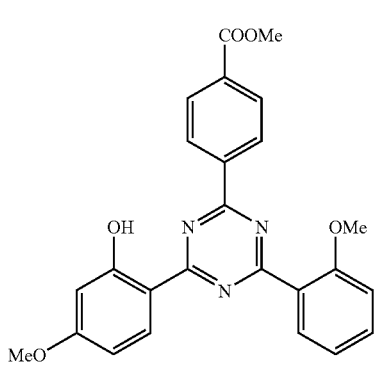 (60)

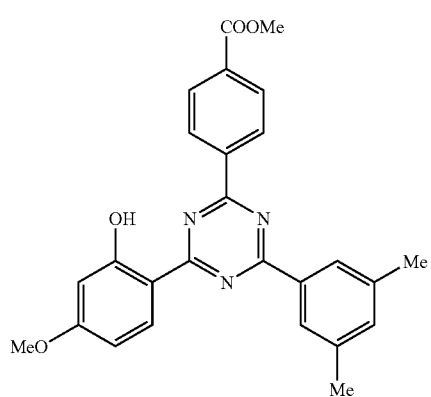
(61)
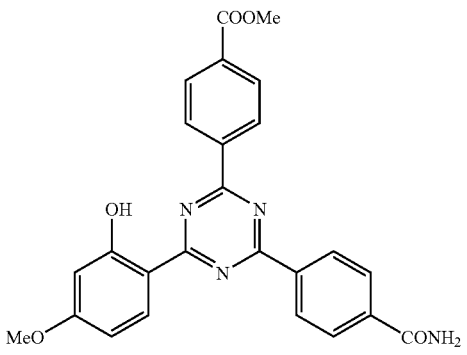
(65)
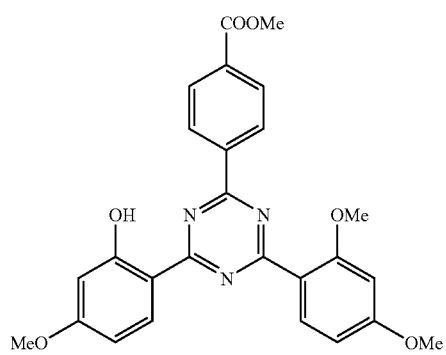
(62)
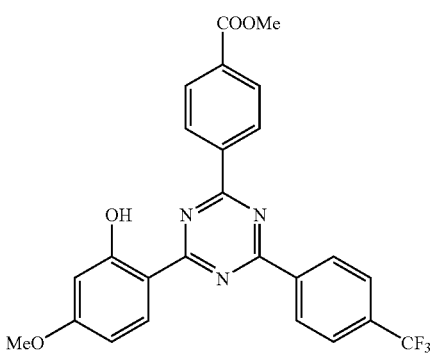
(66)
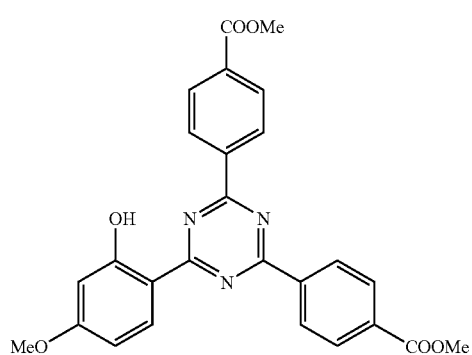
(63)
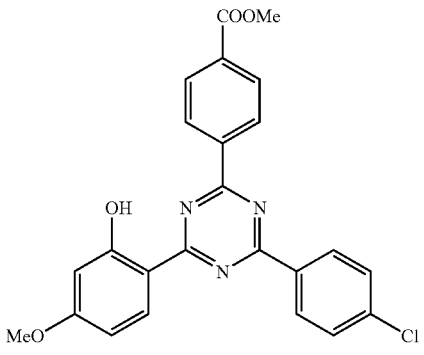
(67)
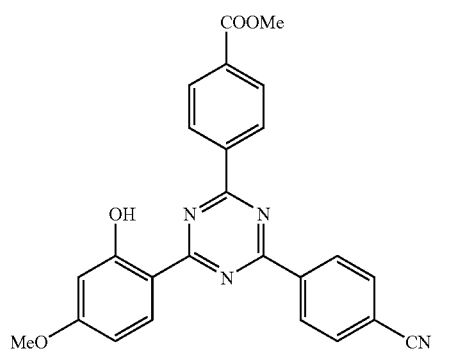
(64)
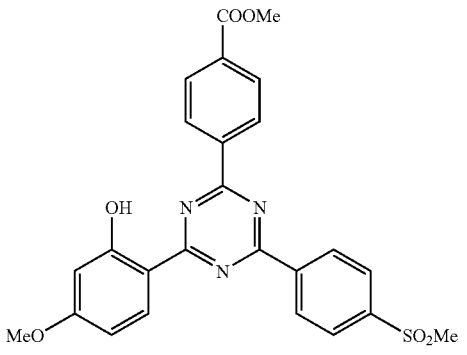
(68)

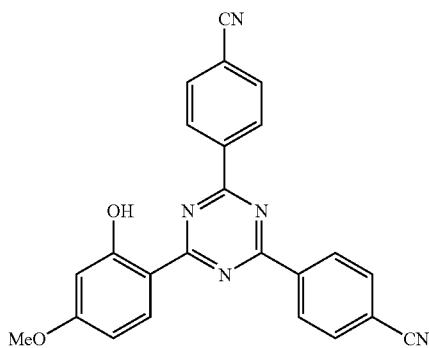
(69)
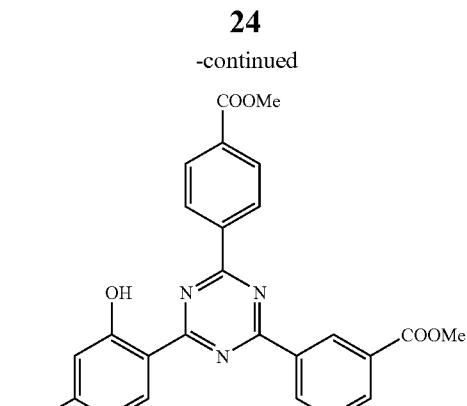
(73)
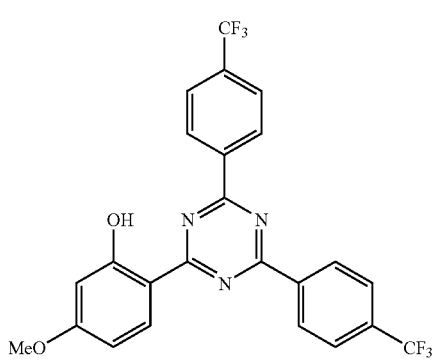
(70)
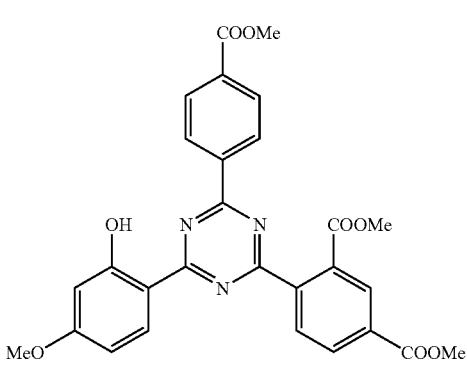
(74)
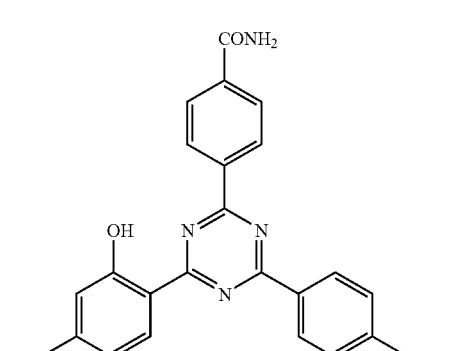
(71)
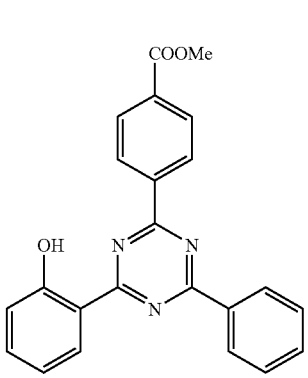
(75)
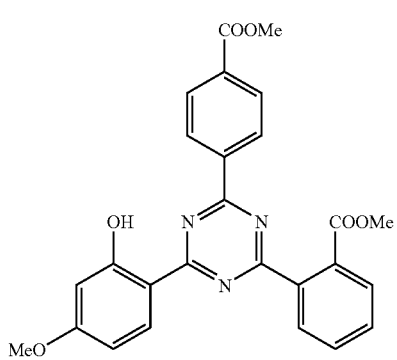
(72)
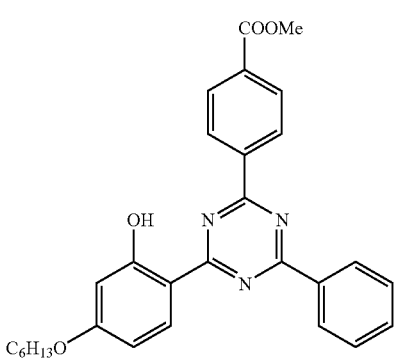
(76)

(77) 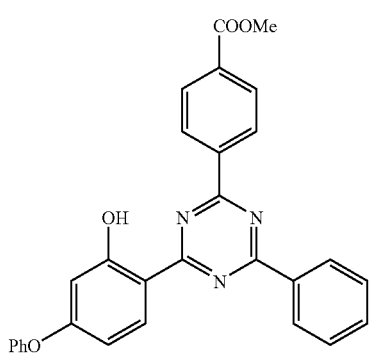
(78) 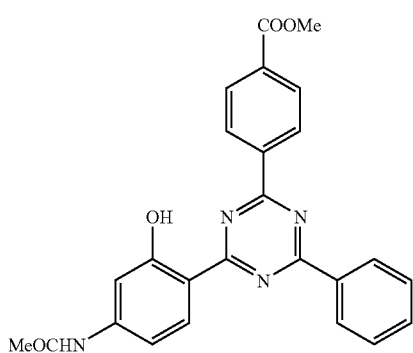
(79) 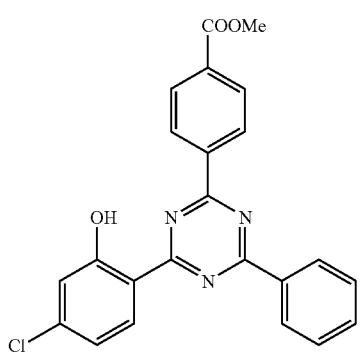
(80) 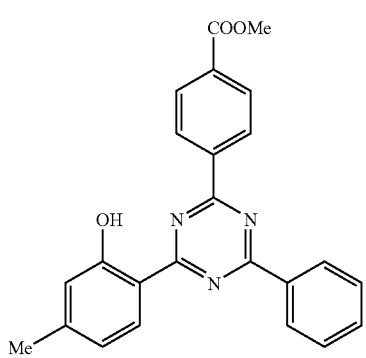
(81) 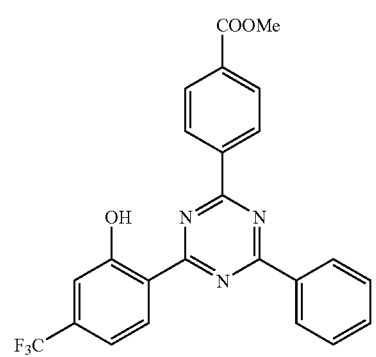
(82) 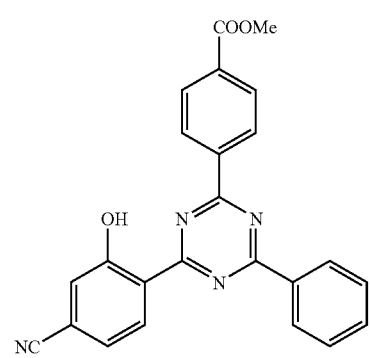
(83) 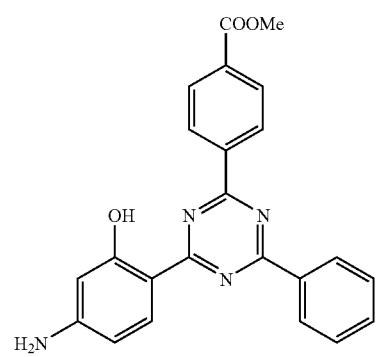
(84) 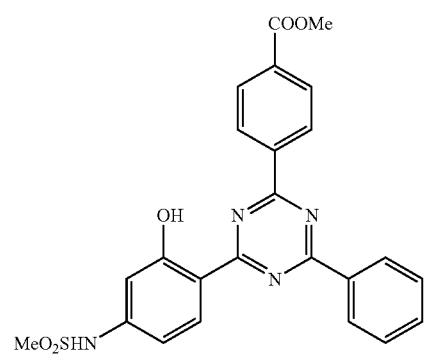

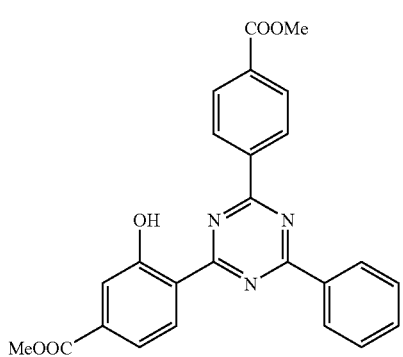 (85)
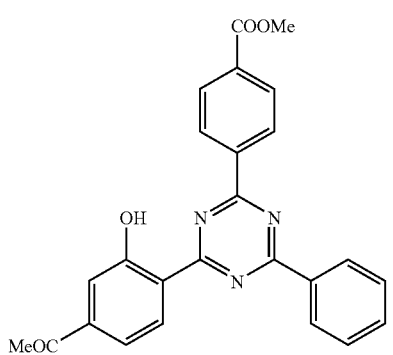 (86)
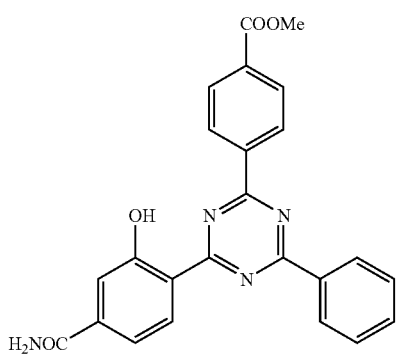 (87)
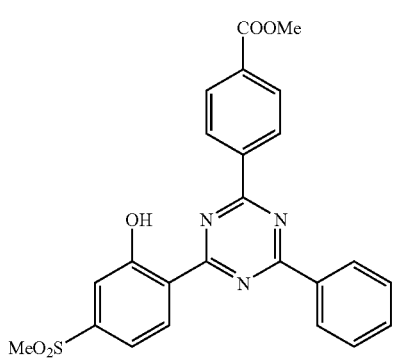 (88)
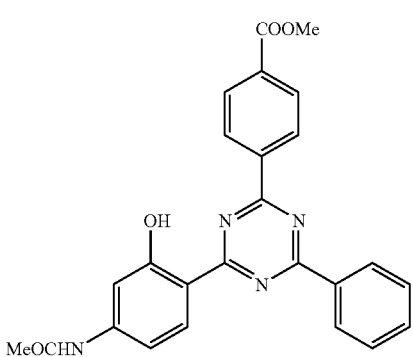 (89)
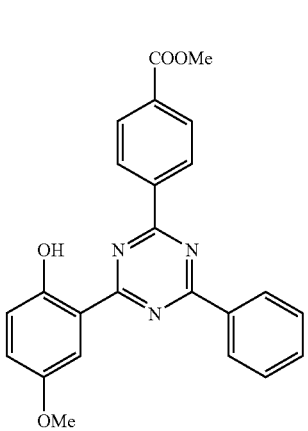 (90)
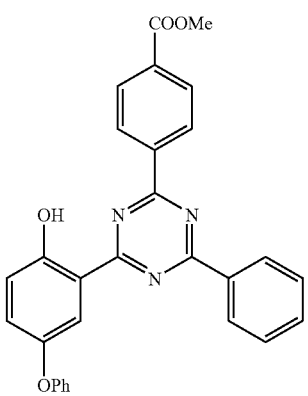 (91)
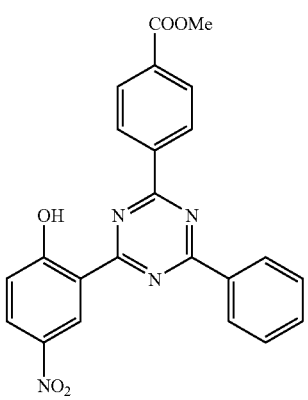 (92)

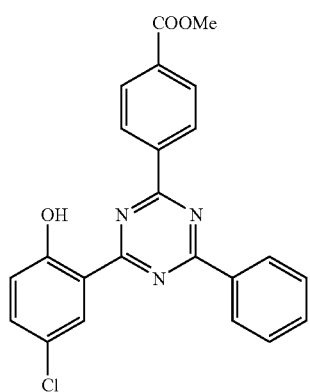
(93)
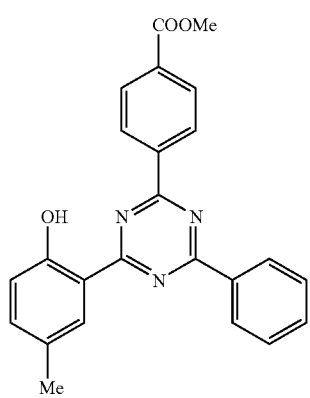
(94)
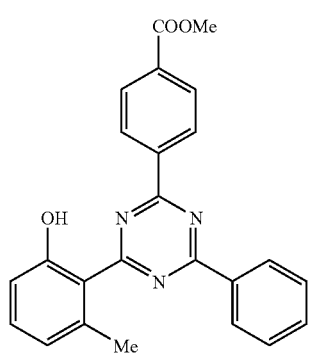
(95)
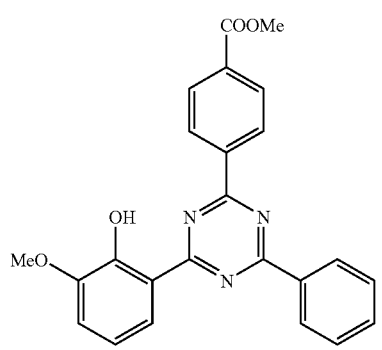
(96)
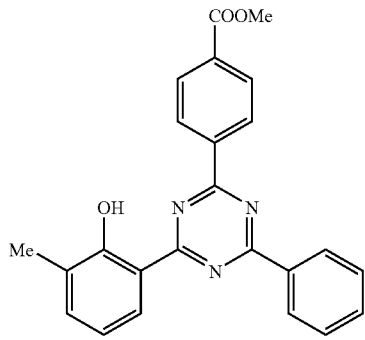
(97)
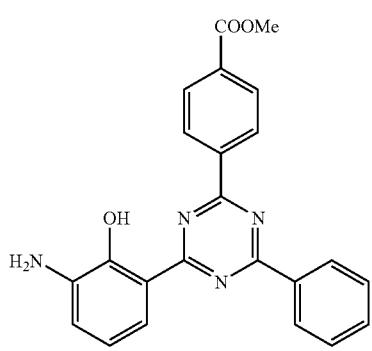
(98)
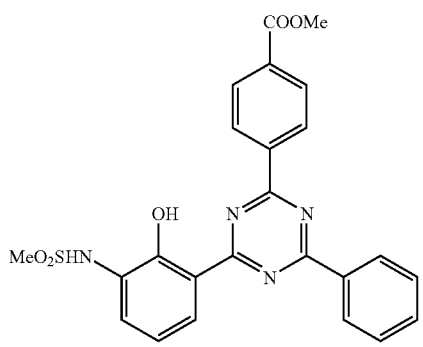
(99)
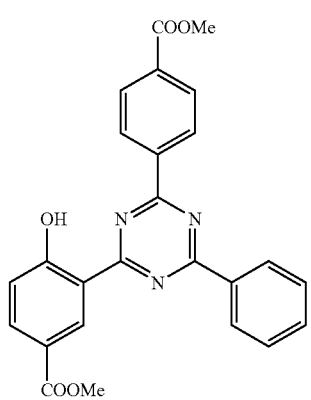
(100)

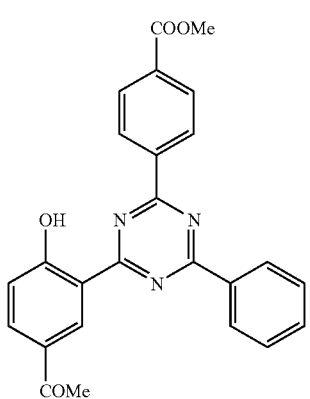
(101)
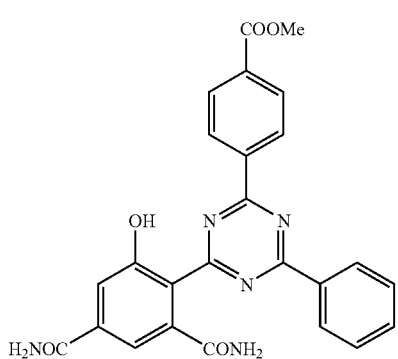
(102)
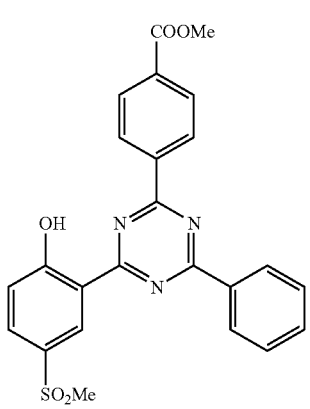
(103)
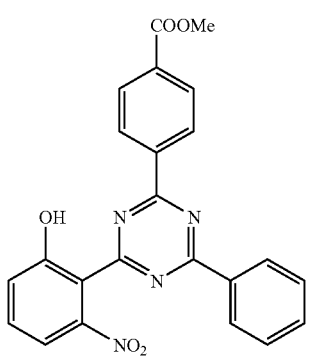
(104)
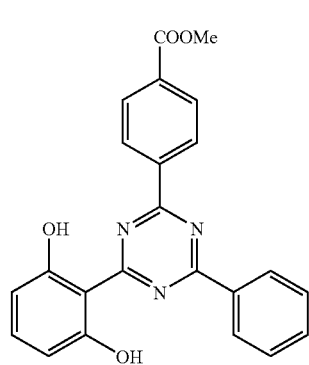
(105)
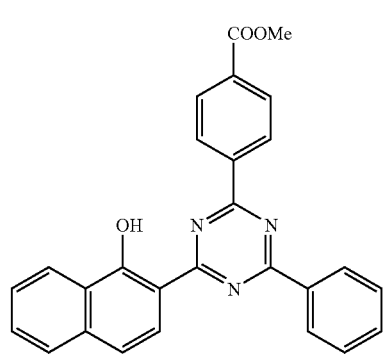
(106)
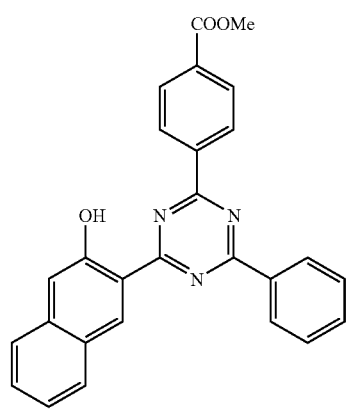
(107)
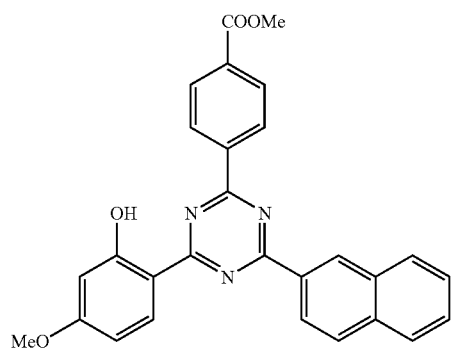
(108)

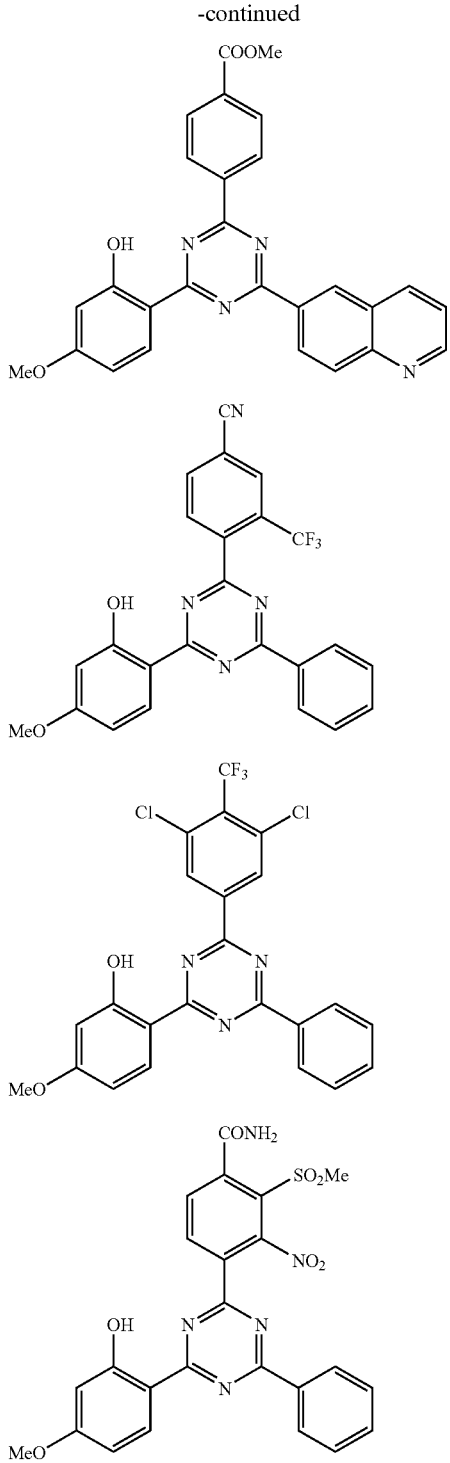

Understandably, the compounds (I) may exist in several different tautomeric forms depending on the structure and the surrounding environment, though not specifically described. Thus, in this description the disclosure of one tautomeric form discloses each and all of the tautomers.

The compound (I) may contain an isotope, such as $^2H$, $^3H$, $^{13}C$, $^{15}N$, $^{17}O$, or $^{18}O$.

The compound (I) can be synthesized by any process. For example, synthesis may be achieved by reference to available patent or non-patent documents, e.g., JP 7-188190A, JP 11-315072A, JP 2001-220385A, and *Dyestuff & Chemicals*, vol. 40, No. 12, pp. 325-339 (1995). More specifically, compound (19), for instance, may be synthesized by the reaction between 4-methoxysalicylamide, 3,5-bis(trifluoromethyl) benzoyl chloride, and benzamidine hydrochloride.

The compound (I) is suitable to stabilize an organic material against damage by light, oxygen, or heat. In particular, the compound (I) is preferably used as a photostabilizer or UV absorber, more preferably as a UV absorber. The compound (I) used as a UV absorber will sometimes be referred to as a UV absorber (I).

The compounds (I) may be used either individually or as a combination of two or more thereof.

The maximum absorption wavelength of the UV absorber (I) is preferably, though not exclusively, in the range of from 250 to 400 nm, more preferably from 280 to 380 nm. The half bandwidth of the absorption spectrum is preferably 20 to 100 nm, more preferably 40 to 80 nm.

The maximum absorption wavelength and the half bandwidth as referred to above are easily measured by those skilled in the art. The method of measurement is described, e.g., in The Chemical Society of Japan (ed.), *Jikken Kagaku Koza* (Encyclopedia of Experimental Chemistry) 7, "Bunko II", 4th Ed., Maruzen, pp. 180-186, 1992. Specifically, a sample dissolved in an appropriate solvent is placed in a quartz or glass cell, and the absorption spectra of the sample cell and an identical cell containing only the solvent for control are measured using a spectrophotometer. The solvent to be used for the measurement is required to have no absorption in the wavelength range of interest and little interaction with solute molecules and not to be very volatile as well as to be capable of dissolving the sample. Any solvent that satisfies these requirements may be used. In the invention, all the measurements were conducted using ethyl acetate (EtOAc) as a solvent.

In the invention, the maximum absorption wavelength and the half bandwidth of the UV absorbers were measured using a solution of a sample in ethyl acetate in a concentration of $5 \times 10^{-5}$ mol·dm$^{-3}$ and a quartz cell having an optical path length of 10 mm.

The half bandwidth of an absorption spectrum is described, e.g., in The Chemical Society of Japan (ed.), *Jikken Kagaku Koza* (Encyclopedia of Experimental Chemistry) 3, "Kihon Sosa III", 4th Ed., Maruzen (1991), p. 154. While in the literature cited above the half bandwidth is explained using a graph in which the abscissa represents the wavenumber, the half bandwidth as referred to in the description of the invention is expressed in wavelength (nm) plotted as abscissa. Specifically, the half bandwidth is the full width of an absorption band at the absorbance corresponding to half the peak at the maximum absorption wavelength, which is a parameter representing the shape of the absorption spectrum. A spectrum having a small half bandwidth is sharp, while a spectrum with a large half bandwidth is broad. A UV absorber showing a broad spectrum shows an absorption in a broad range of from the maximum absorption wavelength to the longer wavelength side. Therefore, in order to effectively shield the UV-A region without a yellowish tinge, a UV absorbing compound having an absorption spectrum with a small half bandwidth is preferred.

As described in Sumio Tokita, *Chemistry Seminar 9. Color Chemistry*, p. 154-155, Maruzen, 1982, the intensity of light absorption, i.e., oscillation strength is proportional to the integration of molar absorptivity. When an absorption spectrum has good symmetry, oscillation strength is proportion to the product of peak absorbance and half bandwidth, provided that the half bandwidth is the value in wavelength (nm) along the abscissa. This means that, with the transition moment being equal, a compound having a spectrum with a smaller half bandwidth has a larger peak absorbance. Although such a UV absorbing compound effectively shields light in the region near the maximum absorption wavelength at a low amount, it is unable to shield a broad range of wavelengths because the absorbance drastically decreases at wavelengths slightly away from the maximum absorption wavelength.

The UV absorber preferably has a molar absorptivity of 20000 or more, more preferably 30000 or more, even more preferably 50000 or more, at the maximum absorption wavelength. As long as the molar absorptivity at the peak wavelength is 20000 or more, sufficient absorption efficiency is obtained per mass of the UV absorber so that the amount of the UV absorber required to completely absorb the UV region may be reduced. This is favorable from the standpoint of skin irritation, accumulation in a body, and bleeding.

The definition of the term "molar absorptivity" as used herein is described, e.g., in The Chemical Society of Japan (ed.), *Shin-Jikken Kagaku Koza* 9, "Bunseki Kagaku II", p. 244, Maruzen Press (1977). The molar absorptivity is determined together with the above described measurement of absorption maximum wavelength and half bandwidth.

As stated, the UV absorber composition of the invention contains the compound (I) and a UV absorber having a maximum absorption wavelength of 340 to 400 nm.

The UV absorber having a maximum absorption wavelength of 340 to 400 nm preferably has a different basic skeletal structure from that of the compound (I). A combination of two UV absorbers different in basic skeletal structure allows for absorbing a broader wavelength range of UV rays. To use the compound (I) in a UV absorber composition is also effective in stabilizing the dispersed state of the UV absorber.

The UV absorber having a maximum absorption at 340 to 400 nm is not particularly limited and can include benzotriazole compounds, benzophenone compounds, benzoxazinone compounds, cyanoacrylate compounds, benzoxazole compounds, merocyanine compounds, and triazine compounds. Also useful are those described in *Fine Chemical*, May, 2004, pp. 28-38, CMC Publishing Co., Ltd., *Kobunshiyo Kinousei Tenkazaino Shintenkai*, R & D Division of Toray Research Center, pp. 96-140, 1999, and Ohkatsu Yasukazu (editorial supervisor), *Kobunshi Tenkazaino Kaihatsuto Kankyo Taisaku*, pp. 54-64, CMC Publishing Co., Ltd., 2003.

The UV absorber having a maximum absorption at 340 to 400 nm is preferably at least one compound selected from benzotriazole compounds, benzophenone compounds, benzoxazinone compounds, cyanoacrylate compounds, benzoxazole compounds, merocyanine compounds, and triazine compounds, more preferably a benzoxazinone compound.

Benzoxazinone compounds have an effective absorption at wavelengths of about 340 to 420 nm and include 2,2'-p-phenylenebis(4H-3,1-benzoxazin-4-one), 2,2'-p-phenylenebis(6-methyl-4H-3,1-benzoxazin-4-one), 2,2'-p-phenylenebis(6-chloro-4H-3,1-benzoxazin-4-one), 2,2'-p-phenylenebis(6-methoxy-4H-3,1-benzoxazin-4-one), 2,2'-p-phenylenebis(6-hydroxy-4H-3,1-benzoxazin-4-one), 2,2'-(naphthalene-2,6-diyl)bis(4H-3,1-benzoxazin-4-one), 2,2'-(naphthalene-1,4-diyl)bis(4H-3,1-benzoxazin-4-one), 2,2'-(thiophene-2,5-diyl)bis(4H-3,1-benzoxazin-4-one), 2,2'-(furan-2,5-diyl)bis(4H-3,1-benzoxazin-4-one), and 2,2'-(pyrrole-2,5-diyl)bis(4H-3,1-benzoxazin-4-one). Preferred of them is a benzoxazinone compound represented by formula (II):

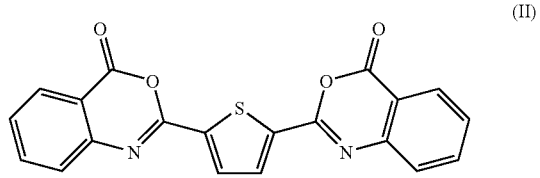

Benzotriazole compounds have an effective absorption at wavelengths of about 270 to 380 inn and include 2-(2'-hydroxy-5'-methylphenyl)benzotiazole, 2-(2'-hydroxy-5'-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-{2'-hydroxy-3'-t-butyl-5'-[2-(octyloxycarbonyl)ethyl]phenyl}-5-chlorobenzotriazole, 2-(2'-hydroxy-3'-dodecyl-5'-methylphenyl)-5-chlorobenzotriazole, 2-(2'-hydroxy-3',5'-di-t-amylphenyl)benzotriazole, 2-(2'-hydroxy-5'-t-octylphenyl)benzotriazole, 2-[2'-hydroxy-3',5'-di(dimethylbenzyl)phenyl]benzotriazole, 2-(2'-hydroxy-4'-octyloxyphenyl)benzotriazole, 2,2'-methylene-bis[2-(2'-hydroxy-5'-t-octylphenyl)benzotriazole], and 2-{[2'-hydroxy-3'-(3,4,5,6-tetrahydrophthalimidylmethyl)-5'-methylbenzyl]phenyl}benzotriazole.

Benzophenone compounds have an effective absorption at wavelengths of about 270 to 380 nm and include 2,4-dihydroxybenzophenone, 2-hydroxy-4-methoxybenzophenone, 2-hydroxy-4-octyloxybenzophenone, 2-hydroxy-4-dodecyloxybenzophenone, 2-hydroxy-4-benzyloxybenzophenone, 2-hydroxy-4-(2-hydroxy-3-methacryloxypropoxy)benzophenone, 2-hydroxy-4-methoxy-5-sulfobenzophenone, 2-hydroxy-4-methoxy-5-sulfobenzophenone trihydrate, 2-hydroxy-4-methoxy-2'-carboxybenzophenone, 2-hydroxy-4-octadecyloxybenzophenone, 2-hydroxy-4-diethylamino-2'-hexyloxycarbonylbenzophenone, 2,2'-dihydroxy-4-methoxybenzophenone, 2,2',4,4'-tetrahydroxybenzophenone, 2,2'-dihydroxy-4,4'-dimethoxybenzophenone, and 1,4-bis(4-benzyloxy-3-hydroxyphenoxy)butane.

Cyanoacrylate compounds have an effective absorption at wavelengths of about 270 to 350 nm and include 2-ethylhexyl 2-cyano-3,3-diphenylacrylate, ethyl 2-cyano-3,3-diphenylacrylate, hexadecyl 2-cyano-3-(4-methylphenyl)acrylate, 2-cyano-3-(4-methylphenyl)acrylic acid salts, and 1,3-[bis(2'-cyano-3,3'-diphenylacryloyl)oxy]-2,2-bis{[(2'-cyano-3,3'-diphenylacryloyl)oxy]methyl}propane.

Triazine compounds have an effective absorption at wavelengths of about 270 to 380 nm and include 2-(4-hexyloxy-2-hydroxyphenyl)-4,6-diphenyl-1,3,5-triazine, 2-(4-octyloxy-2-hydroxyphenyl)-4,6-di(2,5-dimethylphenyl)-1,3,5-triazine, 2-(4-butoxy-2-hydroxyphenyl)-4,6-di(4-butoxyphenyl)-1,3,5-triazine, 2-(4-butoxy-2-hydroxyphenyl)-4,6-di(2,4-didutoxyphenyl)-1,3,5-triazine, 2-{4-[3-(2-ethylhexcyloxy)-2-hydroxypropoxy]-2-hydroxyphenyl}-4,6-di(2,4-dimethylphenyl)-1,3,5-triazine, 2-[4-(3-dodecyloxy-2-hydroxypropoxy)-2-hydroxyphenyl]-4,6-di(2,4-dimethylphenyl)-1,3,5-triazine, 2,4-di(4-butoxy-2-hydroxphenyl)-6-(4-butoxyphenyl)-1,3,5-triazine, and 2,4-di(4-butoxy-2-hydroxyphenyl)-6-(2,4-dibutoxyphenyl)-1,3, 5-triazine.

Benzoxazole compounds have an effective absorption at wavelengths of about 340 to 420 nm and include 2,5-thiophenediyl(5-tert-butyl-1,3-benzoxazole), 4,4'-bis(benzoxazol-2-yl)stilbene, 2,6-di(benzoxazol-2-yl)naphthalene, 1,4-di(benzoxazol-2-yl)naphthalene, and 1,4-di(benzoxazol-2-yl)benzene.

Merocyanine compounds have an effective absorption at wavelengths of about 340 to 400 nm and include octyl-5-N,N-diethylamino-2-phenylsulfonyl-2,4-pentadienoate.

As previously stated, it is preferred to combine the compound (I) with a benzoxazinone compound.

While the combination of the compound (I) and a UV absorber having a maximum absorption wavelength in the range of from 340 to 400 nm provides practically sufficient UV shielding effect, the UV absorber composition of the invention may further contain a white pigment having high hiding power, such as titanium oxide, where strict UV cut performance is demanded. The UV absorber composition may further contain a trace amount (not more than 0.05% by mass) of a colorant according to the user's taste or when the appearance or color tone of the composition is of concern. A fluorescent whitening agent may be added in applications where transparency or whiteness is of importance. Examples useful as a fluorescent whitening agent include the compounds of formula [1] of JP 2002-53824A and compound Nos. 1 through 35 given therein.

The UV absorber composition may be in the form of a dispersion or solution in a liquid medium.

The UV absorber composition of the invention in the form of a dispersion in a dispersing medium will be described first.

The liquid medium in which the UV absorbers are dispersed is not particularly limited and is exemplified by water, an organic solvent, a resin, or a resin solution, or a mixture thereof.

Examples of the organic solvent as a dispersing medium that can be used in the invention include hydrocarbons, such as pentane, hexane, and octane; aromatics, such as benzene, toluene, and xylene; ethers, such as diethyl ether and methyl t-butyl ether; alcohols, such as methanol, ethanol, and isopropyl alcohol; esters, such as ethyl acetate and butyl acetate; ketones, such as acetone and methyl ethyl ketone; nitriles, such as acetonitrile and propionitrile; amides, such as N,N-dimethylformamide, N,N-dimethylacetamide, and N-methylpyrrolidone; sulfoxides, such as dimethyl sulfoxide; amines, such as triethylamino and tributyl amine; carboxylic acids, such as acetic acid and propionic acid; halogen compounds, such as methylene chloride and chloroform; and heterocyclic compounds, such as tetrahydrofuran and pyridine. These solvents may be used in combination at any mixing ratio.

The resins that can be used as a dispersing medium include thermoplastic and thermosetting resins conventionally used in the manufacture of various molded articles, sheets and films. Examples of the thermoplastic resins include polyethylene resins, polypropylene resins, poly(meth)acrylate resins, polystyrene resins, styrene-acrylonitrile resins, acrylonitrile-butadiene-styrene resins, polyvinyl chloride resins, polyvinylidene chloride resins, polyvinyl acetate resins, polyvinyl butyral resins, ethylene-vinyl acetate copolymer resins, ethylene-vinyl alcohol copolymer resins, polyethylene terephthalate resins, polybutylene terephthalate resins, liquid crystal polyester resins, polyacetal resins, polyamide resins, polycarbonate resins, polyurethane resins, and polyphenylene sulfide resins. These resins are used either individually or in combination of two or more thereof in the form of a polyblend or a polyalloy. These resins may be mixed with fillers, such as glass fiber, carbon fiber, partially carbonized fiber, cellulose fiber, and glass beads, or flame retardants for use as thermoplastic compounds. The resins may also be mixed with one or more additives conventionally used in resin compounds, such as polyolefin resin powder, polyolefin waxes, ethylenebisamide waxes, metal soaps, and so on.

Examples of the thermosetting resins include epoxy resins, melamine resins, and unsaturated polyester resins. These resins may be mixed with fillers, such as glass fiber, carbon fiber, partially carbonized fiber, cellulose fiber, and glass beads, or flame retardants for use as thermosetting compounds.

The dispersion containing the UV absorbers may contain additives, such as a dispersant, an antifoaming agent, a preservative, antifreezing agent, and a surfactant, and any other compound as desired, such as a dye, a pigment, an IR absorber, a fragrance, a polymerizable compound, a polymer, an inorganic substance, or a metal compound.

The dispersion containing the UV absorbers is obtained by use of a high-speed agitation type disperser exerting a large shear force, a disperser exerting high-intensity ultrasonic energy, and the like. Examples of such equipment include a colloid mill, a homogenizer, a capillary emulsifier, a liquid siren, an electro-magnetostrictive ultrasonic generator, and an emulsifier having a Pohlmann whistle. The high-speed agitation type dispersers suited for use in the invention are those in which an element performing dispersing action rotates at high speed (e.g., 500 to 15,000 rpm, preferably 2,000 to 4,000 rpm) in liquid, such as dissolvers, Polytron, homomixers, homoblenders, Keddy mill, and Jet Ajitor. The high-speed agitation type dispersers called dissolvers or high-speed impeller dispersers are suitably used in the invention. A preferred example of the dispersers of this type is disclosed in JP 55-129136A, the impeller of which is a disk-shaped blade, with the edge thereof alternately bent downward and upward, fitted on a high-speed rotational shaft.

An emulsified dispersion containing a hydrophobic compound may be prepared following a variety of processes. For example, in dissolving a hydrophobic compound in an organic solvent, the compound is dissolved in one of a high boiling organic substance, a water-immiscible low-boiling organic solvent, a water-miscible organic solvent, and a mixture of any two or more thereof, and the resulting solution is dispersed in water or a hydrophilic colloid aqueous solution in the presence of a surfactant. The hydrophobic compound-containing water-insoluble phase and the aqueous phase are mixed by adding the former to the latter while stirring (what we call a normal mixing method) or vice versa (what we call a reverse mixing method).

The UV absorber composition in the form of a solution in a liquid medium will then be described.

The liquid medium in which the UV absorbers are dissolved is not particularly limited and is exemplified by water, an organic solvent, a resin, or a resin solution, or a mixture thereof Examples of the organic solvent, resin, and resin solution include those recited above as examples of the dispersing medium.

The solution containing the UV absorbers may contain any other compound as desired, such as a dye, a pigment, an IR absorber, a fragrance, a polymerizable compound, a polymer, an inorganic substance, or a metal compound. The components other than the UV absorbers do not always need to be dissolved in the medium.

The total content of the UV absorbers in the UV absorber-containing solution is not specified because it varies depending on the intended end use and form of the final product. Basically, the UV absorbers may have any concentrations according to the intended end use. A preferred total concentration is 0.001% to 30% by mass, more preferably 0.01% to 10% by mass. A high concentration solution may be prepared, which is diluted to a desired concentration upon use. The diluting solvent may be selected from those recited above.

The compounds and articles that can be stabilized by the UV absorber composition of the invention include dyes, pigments, foods, beverages, body care products, vitamin preparations, pharmaceutical preparations, inks, oils, fats, waxes, surface coatings, cosmetics, photographic materials, textiles and colorants therefor, plastic materials, rubber, paints, resin compositions, and polymer additives.

The UV absorber composition of the invention may be used in any manner. The combination of the UV absorbers of the invention may be used alone but is preferably in the form of a resin composition. A resin composition containing the UV absorbers of the invention will now be described.

The resin composition containing the UV absorbers contains a resin. The UV absorber-containing resin composition may be in the form of a solution of a resin in an appropriate solvent.

The UV absorbers of the invention, i.e., the compound (I) and the UV absorber having a maximum absorption wavelength at 340 to 400 nm, may be incorporated into a resin composition by various methods. In the cases where the UV absorbers of the invention are compatible with a resin composition, they may be added directly to the resin composition. The UV absorbers of the invention may be once dissolved in an auxiliary solvent having compatibility with the resin composition to prepare a solution, which is then added to the resin composition. The UV absorbers may be once dispersed in a high boiling organic solvent or a polymer to make a dispersion, which is then added to the resin composition.

The high boiling organic solvent preferably has a boiling temperature of 180° C. or higher, more preferably 200° C. or higher. The high boiling organic solvent preferably has a melting temperature of 150° C. or lower, more preferably 100° C. or lower. Examples of the high boiling organic solvent include phosphoric esters, phosphonic esters, benzoic esters, phthalic esters, fatty acid esters, carbonic esters, amides, ethers, halogenated hydrocarbons, alcohols, and paraffins. Preferred of them are phosphoric esters, phosphonic esters, phthalic esters, benzoic esters, and fatty acid esters.

For the details of the method of incorporating the UV absorbers of the invention into a resin composition, reference can be made to JP 58-209735A, JP 63-264748A, JP 4-191851A, JP 8-272058A, and British Patent 2016017A.

The resin that can be used in the resin composition may be either natural or synthetic. Examples of useful resins include polyolefins, such as polyethylene, polypropylene, polyisobutylene, poly(1-butene), poly(4-methylpentene), polyvinylcyclohexane, polystyrene, poly(p-methylstyrene), poly(α-methylstyrene), polyisoprene, polybutadiene, polycyclopentene, and polynorbornene; copolymers of a vinyl monomer, such as an ethylene-propylene copolymer, an ethylene-methylpentene copolymer, an ethylene-heptene copolymer, an ethylene-vinylcyclohexane copolymer, an ethylene-cycloolefin (e.g., norbornene) copolymer, a propylene-butadiene copolymer, an isobutylene-isoprene copolymer, an ethylene-vinylcyclohexene copolymer, an ethylene-alkyl acrylate copolymer, and an ethylene-alkyl methacrylate copolymer; acrylic polymers, such as polymethacrylates, polyacrylates, polyacrylamide, and polyacrylonitrile; polyvinyl chloride, polyvinylidene chloride, polyvinyl fluoride, polyvinylidene fluoride, a vinyl chloride-vinyl acetate copolymer; polyethers, such as polyalkylene glycol, polyethylene oxide, and polypropylene oxide; polyacetals, such as polyoxymethylene; polyamide, polyimide, polyurethane, polyurea; polyesters, such as polyethylene terephthalate and polyethylene naphthalate; polycarbonate, polyketone, polysulfone polyether ketone, phenol resins, melamine resins; cellulose esters, such as diacetyl cellulose, triacetyl cellulose, propionyl cellulose, butyryl cellulose, acetylpropionyl cellulose, and nitrocellulose; polysiloxane; and natural polymers, such as cellulose, rubber, and gelatin.

The resin for use in the resin composition of the invention is preferably a synthetic resin. The resin is more preferably a polyolefin, an acrylic polymer, a polyester, polycarbonate, or a cellulose ester; more preferably polyethylene, polypropylene, poly(4-methylpentene), polymethyl methacrylate, polycarbonate, polyethylene terephthalate, polyethylene naphthalate, polybutylene terephthalate, or triacetyl cellulose.

The resin for use in the resin composition of the invention is preferably the thermoplastic resin.

The UV absorbers of the invention may be present in the resin composition in amounts necessary to impart desired performance properties to the resin composition. A proper total content of the UV absorbers is decided according to the compounds and resin used. A preferred total content is more than 0% and not more than 20% by mass, more preferably 10% by mass or less, even more preferably 0.05% to 5% by mass. With the recited preferred total content, a sufficient UV shielding effect is exhibited without causing bleeding.

If desired, the resin composition of the invention may contain, in addition to the resin and the UV absorbers, appropriate additives, such as antioxidants, photostabilizers, processing stabilizers, anti-aging agents, and compatibilizers.

While the UV absorber-containing resin composition of the invention is useful in all the applications where a synthetic resin is used, it is especially suited for use in applications where a resin composition is possibly exposed to sunlight or light containing UV rays. Examples of such applications include glass substitutes and surface coating materials therefor; glazing of houses, facilities, and transport means; coating materials for daylighting glazing and light source protective glass; window films for houses, facilities, and transport means; interior and exterior materials of houses, facilities, and transport means, coating materials for the interior and exterior materials, and coatings produced from the coating materials; alkyd resin lacquers and coatings produced from the lacquers; acrylic lacquers and coatings produced from the lacquers; parts of light sources emitting UV light, such as fluorescent lamps and mercury lamps; parts of precision machines and electric/electronic equipment; shields against electromagnetic waves from various displays; containers and packages for foods, chemicals, drugs, and so on, such as bottles, boxes, blister packages, cups, and specialty packages; compact disc coatings; agricultural sheets or films; anti-fading agents for printed articles, dyed articles, dyes, and pigments; protective coatings for polymer substrates (e.g. for plastic parts, such as machine and automobile parts); overcoatings for printed matter; inkjet media coatings; matte layers for lamination; optical light films; safety glass/windshield interlayers; electrochromic/photochromic applications; overlaminate films; solar control films; cosmetics, such as sunscreens, shampoos, rinses, and hairdressing products; fiber clothing (e.g., sportswear, stockings, and headwear) and fibers; domestic interior articles, such as curtains, rugs or carpets, and wallpaper; medical devices, such as plastic lenses, contact lenses, and artificial eyes; optical articles, such as optical filters, backlit display films, prisms, mirrors, and photographic materials; in-mold films; decals; anti-graffiti films; stationery, such as tapes and inks; and signage and surface coating materials therefor.

The molded articles obtained from the resin composition of the invention may have any form, such as flat film, powder, spherical particle, ground particle, continuous lump, fiber, tube, hollow fiber, granule, or plate, either porous or non-porous.

Containing the UV absorbers of the invention, the polymer material of the invention has excellent light resistance (fastness to UV light) and does not suffer from precipitation of the UV absorber or bleeding of the UV absorber during long-term use. Since the resin composition of the invention exhibits high UV-A absorptivity, it is useful as UV absorbing filters or containers that protect, for example, UV-labile compounds. For instance, the resin composition may be molded by any method, such as extrusion or injection molding, to obtain a molded article (e.g., a container) of the resin composition. The resin composition may also be applied in the form of solution onto a separately produced molded article and dried to provide the molded article with a UV-absorbing coating of the resin composition.

In the cases where the resin composition is used as a UV absorbing filter or film, it is preferred that the resin be transparent. Examples of transparent resins include cellulose esters (e.g., diacetyl cellulose, triacetyl cellulose, propionyl cellulose, butyryl cellulose, acetylpropionyl cellulose, and nitrocellulose), polyamide, polycarbonate, polyesters (e.g., polyethylene terephthalate, polyethylene naphthalate, polybutylene terephthalate, poly(1,4-cyclohexanedimethylene terephthalate), and polyethylene 1,2-diphenoxyethane-4,4'-dicarboxylate), polystyrenes (e.g., syndiotactic polystyrene), polyolefins (e.g., polyethylene, polypropylene, and polymethylpentene), polymethyl methacrylate, polysulfone, polyether sulfone, polyether ketone, polyether imide, and polyoxyethylene. Preferred of them are cellulose esters, polycarbonate, polyesters, polyolefins, and acrylic resins. More preferred are polycarbonate and polyesters. A polyester, particularly polyethylene terephthalate, is even more preferred. The polymer molded article obtained from the resin composition containing such a transparent resin is also useful as a transparent substrate. The transparent substrate preferably has a transmittance of at least 80%, more preferably 86% or more.

EXAMPLES

The invention will now be illustrated in greater detail with reference to Examples, but it should be understood that the invention is not deemed to be limited thereto.

Synthesis Example 1

Preparation of Compound (1)

To 20.0 g of 4-methoxysalicylamide were added 80 ml of acetonitrile and 36.4 g of 1,8-diazabicyclo[5.4.0]undec-7-ene (hereinafter abbreviated as DBU) to make a solution. To the solution was added 23.8 g of methyl 4-(chloroformyl)benzoate, followed by stirring at room temperature for 24 hours. To the reaction mixture were added 100 ml of water and 20 ml of hydrochloric acid. The solid thus precipitated was collected by filtration and washed with water to give 36.0 g (yield: 91%) of intermediate A of formula:

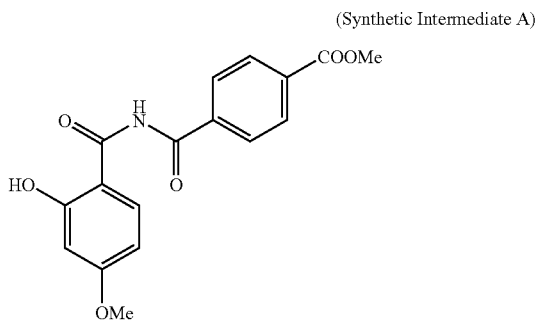

(Synthetic Intermediate A)

To 20.0 g of intermediate A were added 200 ml of acetonitrile and 8.9 g of 95% sulfuric acid, followed by stirring at 90° C. for 4 hours. To the reaction system was added 80 ml of triethylamine, followed by cooling to room temperature. The solid thus formed was collected by filtration and washed with water to afford 17.1 g (90%) of intermediate B of formula:

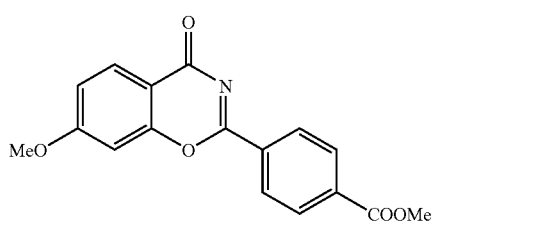

(Synthetic intermediate B)

To 2.8 g of benzamidine hydrochloride were added 100 ml of methanol and 3.4 g of a 28% solution of sodium methoxide in methanol, and 5.0 g of intermediate B was added thereto. The mixture was stirred at 60° C. for 3 hours, followed by cooling to room temperature. Addition of 0.2 ml of hydrochloric acid resulted in formation of a solid, which was collected by filtration and washed successively with water and methanol to yield 6.1 g (92%) of title compound (1).

MS: m/z 414 (M+)
$^1$H NMR (CDCl$_3$): δ6.55-6.56 (1H), δ6.62-6.64 (1H), δ7.58-7.65 (3H), δ8.22-8.24 (2H), δ8.62-8.65 (3H), δ8.71 (2H), δ13.39 (1H)

$\lambda_{max}$=341 nm (EtOAc)

Synthesis Example 2

Preparation of Compound (2)

To 20.0 g of 4-methoxysalicylamide were added 80 ml of acetonitrile and 36.4 g of DBU to make a solution. To the solution was added 19.8 g of 4-cyanobenzoyl chloride, followed by stirring at room temperature for 24 hours. To the reaction mixture were added 100 ml of water and 20 ml of hydrochloric acid. The solid thus precipitated was collected by filtration and washed with water to give 31.2 g (yield: 88%) of intermediate C of formula:

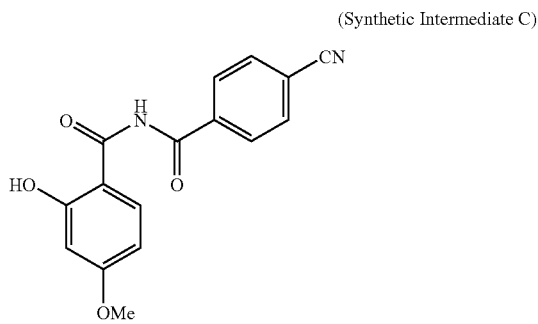

(Synthetic Intermediate C)

To 20.0 g of intermediate C were added 200 ml of acetonitrile and 9.9 g of sulfuric acid, followed by stirring at 90° C. for 4 hours. To the reaction system was added 80 ml of triethylamine, followed by cooling to room temperature. The solid thus precipitated was collected by filtration and washed with water to afford 16.5 g (88%) of intermediate D of formula:

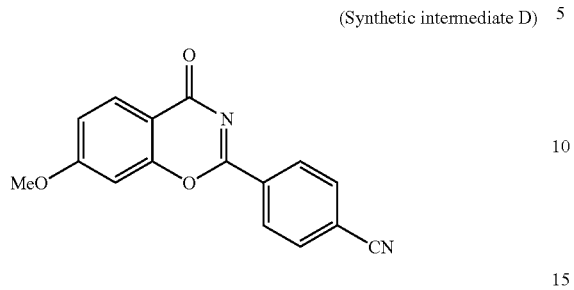
(Synthetic intermediate D)

To 3.1 g of benzamidine hydrochloride were added 100 ml of methanol and 3.8 g of a 28% solution of sodium methoxide in methanol, and 5.0 g of intermediate D was added thereto. The mixture was stirred at 60° C. for 3 hours, followed by cooling to room temperature. Addition of 0.2 ml of hydrochloric acid resulted in precipitation of a solid, which was collected by filtration and washed successively with water and methanol to yield 6.3 g (93%) of title compound (2).

MS: m/z 381 (M+)

$^1$H NMR (CDCl$_3$): δ6.55-6.56 (1H), δ6.62-6.64 (1H), δ7.58-7.62 (3H), δ7.65-7.69 (2H), δ8.60-8.62 (3H), δ8.76 (2H), δ13.26 (1H)

$\lambda_{max}$=342 nm (EtOAc)

Synthesis Example 3

Preparation of Compound (3)

To 20.0 g of 4-methoxysalicylamide were added 80 ml of acetonitrile and 36.4 g of DBU to make a solution. To the solution was added 24.9 g of 4-(trifluoromethyl)benzoyl chloride, followed by stirring at room temperature for 24 hours. To the reaction mixture were added 100 ml of water and 20 ml of hydrochloric acid. The solid thus precipitated was collected by filtration and washed with water to give 37.5 g (yield: 92%) of intermediate E of formula:

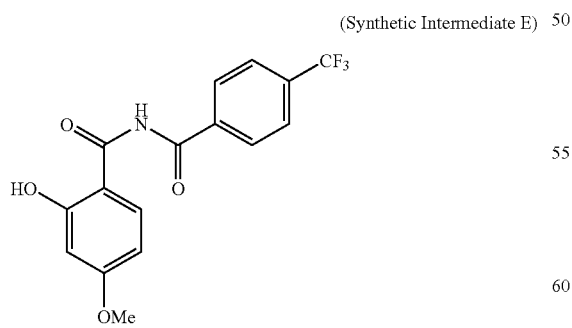
(Synthetic Intermediate E)

To 20.0 g of intermediate E were added 200 ml of acetonitrile and 8.8 g of sulfuric acid, followed by stirring at 90° C. for 4 hours. To the reaction system was added. 80 ml of triethylamine, followed by cooling to room temperature. The solid thus formed was collected by filtration and washed with water to afford 17.0 g (90%) of intermediate F of formula:

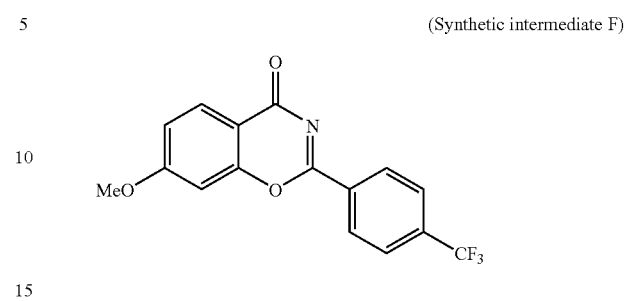
(Synthetic intermediate F)

To 2.8 g of benzamidine hydrochloride were added 100 ml of methanol and 3.3 g of a 28% solution of sodium methoxide in methanol, and 5.0 g of intermediate F was added thereto. The mixture was stirred at 60° C. for 3 hours, followed by cooling to room temperature. Addition of 0.2 ml of hydrochloric acid resulted in formation of a solid, which was collected by filtration and washed successively with water and methanol to yield 6.0 g (92%) of title compound (3).

MS: m/z 424 (M+)

$^1$H NMR (CDCl$_3$): δ6.56-6.57 (1H), δ6.62-6.65 (1H), δ7.58-7.66 (3H), δ7.82-7.85 (2H), δ8.62-8.64 (3H), δ8.76 (2H), δ13.35 (1H)

$\lambda_{max}$=342 nm (EtOAc)

Synthesis Example 4

Preparation of Compound (4)

To 20.0 g of 4-methoxysalicylamide were added 80 ml of acetonitrile and 36.4 g of DBU to make a solution. To the solution was added 20.9 g of 4-chlorobenzoyl chloride, followed by stirring at room temperature for 24 hours. To the reaction mixture were added 100 ml of water and 20 ml of hydrochloric acid. The solid thus precipitated was collected by filtration and washed with water to give 35.0 g (yield: 96%) of intermediate G of formula:

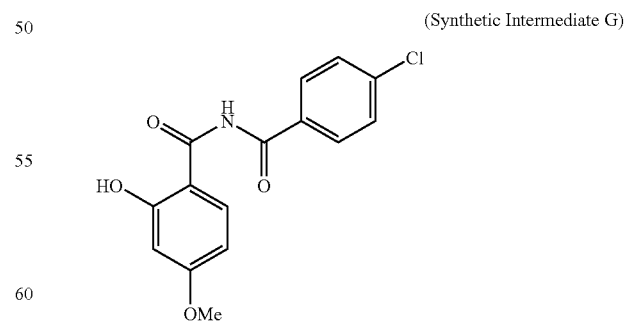
(Synthetic Intermediate G)

To 20.0 g of intermediate G were added 200 ml of acetonitrile and 9.6 g of sulfuric acid, followed by stirring at 90° C. for 4 hours. To the reaction system was added 80 ml of triethylamine, followed by cooling to room temperature. The solid thus formed was collected by filtration and washed with water to afford 17.1 g (91%) of intermediate H of formula:

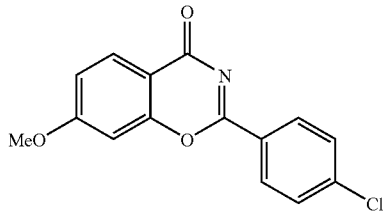

(Synthetic intermediate H)

To 3.0 g of benzamidine hydrochloride were added 100 ml of methanol and 3.7 g of a 28% solution of sodium methoxide in methanol, and 5.0 g of intermediate H was added thereto. The mixture was stirred at 60° C. for 3 hours, followed by cooling to room temperature. Addition of 0.2 ml of hydrochloric acid resulted in precipitation of a solid, which was collected by filtration and washed successively with water and methanol to yield 6.5 g (96%) of title compound (4).

MS: m/z 390 (M+)
$^1$H NMR (CDCl$_3$): δ6.54-6.55 (1H), δ6.61-6.63 (1H), δ7.53-7.67 (5H), δ8.60-8.62 (5H), δ13.26 (1H)
$\lambda_{max}$=340 nm (EtOAc)

Synthesis Example 5

Preparation of Compound (5)

To 20.0 g of 4-methoxysalicylamide were added 80 ml of acetonitrile and 36.4 g of DBU to make a solution. To the solution was added 16.8 g of benzoyl chloride, followed by stirring at room temperature for 24 hours. To the reaction mixture were added 100 ml of water and 20 ml of hydrochloric acid. The solid thus precipitated was collected by filtration and washed with water to give 29.5 g (yield: 91%) of intermediate I of formula:

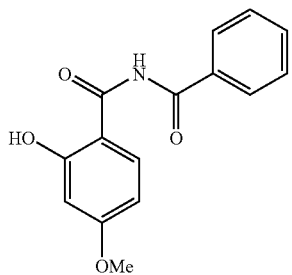

(Synthetic Intermediate I)

To 25.0 g of intermediate I were added 250 ml of acetonitrile and 13.5 g of sulfuric acid, followed by stirring at 90° C. for 4 hours. To the reaction system was added 100 ml of triethylamine, followed by cooling to room temperature. The solid thus formed was collected by filtration and washed with water to afford 21.1 g (91%) of intermediate J of formula:

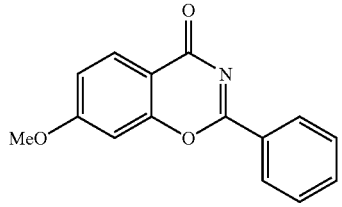

(Synthetic intermediate J)

To 3.5 g of 4-amidinobenzamide hydrochloride were added 100 ml of methanol and 3.4 g of a 28% solution of sodium methoxide in methanol, and 4.0 g of intermediate J was added thereto. The mixture was stirred at 60° C. for 3 hours, followed by cooling to room temperature. Addition of 0.2 ml of hydrochloric acid resulted in formation of a solid, which was collected by filtration and washed successively with water and methanol to yield 5.8 g (92%) of title compound (5).

MS: m/z 399 (M+)
$^1$H NMR (CDCl$_3$): δ6.57 (1H), δ6.63-6.65 (1H), δ7.58-7.66 (3H), δ8.00-8.02 (2H), δ8.64-8.66 (3H), δ8.74 (2H), δ13.41 (1H)
$\lambda_{max}$=340 nm (EtOAc)

Synthesis Example 6

Preparation of Compound (29)

To 10 g of compound (1) were added 31.6 g of 2-ethylhexanol, 0.13 g of sodium methoxide, and 100 ml of xylene, and the mixture was stirred at 90° C. under reduced pressure for 6 hours. To the reaction mixture were added water and ethyl acetate, followed by stirring for liquid-liquid separation. The organic layer was concentrated, and the residue was crystallized from a 1:10 (by volume) mixture of hexane and isopropyl alcohol to give 15.1 g (96%) of title compound (29).

Synthesis Example 7

Preparation of Compound (32)

To 10 g of compound (1) were added 9.8 g of Fine Oxocol 180N (from Nissan Chemical Industries, Ltd.), 0.13 g of sodium methoxide, and 100 ml of xylene, and the mixture was stirred at 90° C. under reduced pressure for 6 hours. To the reaction mixture were added water and ethyl acetate, followed by stirring for liquid-liquid separation. The organic layer was concentrated, and the residue was crystallized from a 1:10 (by volume) mixture of hexane and isopropyl alcohol to give 15.1 g (96%) of title compound (32).

Synthesis Example 8

Preparation of Compound (63)

To 10 g of phenyl 4-methoxysalicylate were added 100 ml of methanol, 15.8 g of a 28% solution of sodium methoxide in methanol, and 14.6 g of methyl 4-amidinobenzoate hydrochloride, and the resulting solution was stirred at 60° C. for 5 hours, followed by cooling to room temperature. Addition of 0.2 ml of hydrochloric acid resulted in precipitation of a solid, which was collected by filtration and washed successively with water and methanol to yield 18.0 g (93%) of title compound (63).

MS: m/z 472 (M+)

Synthesis Example 9

Preparation of Compound (64)

To 4.2 g of 4-amidinobenzamide hydrochloride were added 100 ml of methanol and 3.8 g of a 28% solution of sodium methoxide in methanol to make a solution, and 5.0 g of intermediate D was added thereto, followed by stirring at 60° C. for 3 hours. After cooling to room temperature, 0.2 ml of hydrochloric acid was added to the reaction mixture. The solid thus precipitated was collected by filtration and washed successively with water and methanol to yield 7.5 g (95%) of title compound (64).

MS: m/z 439 (M+)

Synthesis Example 10

Preparation of Compound (65)

To 3.6 g of 4-amidinobenzamide hydrochloride were added 100 ml of methanol and 3.4 g of a 28% solution of sodium methoxide in methanol to make a solution, and 5.0 g of intermediate B was added thereto, followed by stirring at 60° C. for 3 hours. After cooling to room temperature, 0.2 ml of hydrochloric acid was added to the reaction mixture. The solid thus precipitated was collected by filtration and washed successively with water and methanol to yield 6.9 g (94%) of title compound (65).

MS: m/z 457 (M+)

Synthesis Example 11

Preparation of Compound (75)

To 20.0 g of salicylamide were added 80 ml of acetonitrile and 44.4 g of DBU to make a solution. To the solution was added 29.0 g of methyl 4-(chloroformyl)benzoate, followed by stirring at room temperature for 24 hours. To the reaction mixture were added 100 ml of water and 20 ml of hydrochloric acid. The resulting solid was collected by filtration and washed with water to furnish 40.0 g (92%) of intermediate K of formula:

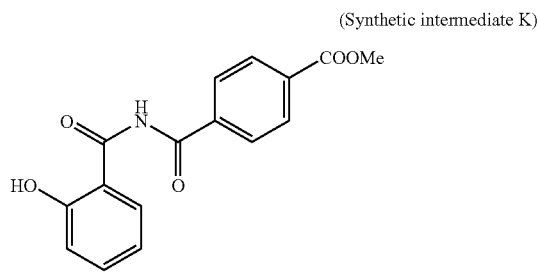

(Synthetic intermediate K)

To 20.0 g of intermediate K were added 200 ml of acetonitrile and 9.4 g of sulfuric acid, followed by stirring at 90° C. for 4 hours. To the reaction mixture was added 80 ml of triethylamine, followed by cooling to room temperature. The resulting solid was collected by filtration and washed with water to give 18.2 g (97%) of intermediate L of formula:

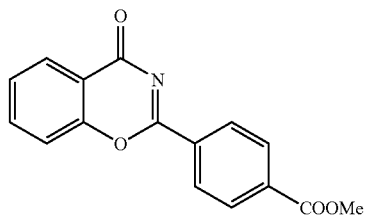

(Synthetic intermediate L)

To 3.1 g of benzamidine hydrochloride were added 100 ml of methanol and 3.8 g of a 28% solution of sodium methoxide in methanol to make a solution, and 5.0 g of intermediate L was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 6.4 g (94%) of title compound (75).

MS: m/z 384 (M+)

Synthesis Example 12

Preparation of Compound (80)

To 20.0 g of 2-hydroxy-4-methylbenzamide were added 80 ml of acetonitrile and 40.3 g of DBU to make a solution. To the solution was added 25.8 g of methyl 4-(chloroformyl)benzoate, followed by stirring at room temperature for 24 hours. To the reaction mixture were added 100 ml of water and 20 ml of hydrochloric acid. The resulting solid was collected by filtration and washed with water to furnish 36.3 g (89%) of intermediate M of formula:

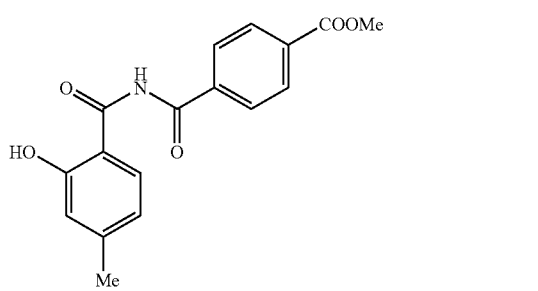

(Synthetic intermediate M)

To 20.0 g of intermediate M were added 200 ml of acetonitrile and 9.1 g of sulfuric acid, followed by stirring at 90° C. for 4 hours. To the reaction mixture was added 80 ml of triethylamine, followed by cooling to room temperature. The resulting solid was collected by filtration and washed with water to give 17.6 g (93%) of intermediate N of formula:

(Synthetic intermediate N)

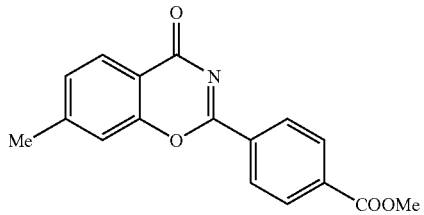

To 2.9 g of benzamidine hydrochloride were added 100 ml of methanol and 3.7 g of a 28% solution of sodium methoxide in methanol to make a solution, and 5.0 g of intermediate N was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 6.3 g (94%) of title compound (75).

MS: m/z 398 (M+)

Synthesis Example 13

Preparation of Compound (81)

To 20.0 g of 2-hydroxy-4-(trifluoromethyl)benzamide were added 80 ml of acetonitrile and 29.7 g of DBU to make a solution. To the solution was added 19.4 g of methyl 4-(chloroformyl)benzoate, followed by stirring at room temperature for 24 hours. To the reaction mixture were added 100 ml of water and 20 ml of hydrochloric acid. The resulting solid was collected by filtration and washed with water to furnish 34.1 g (95%) of intermediate O of formula:

(Synthetic intermediate O)

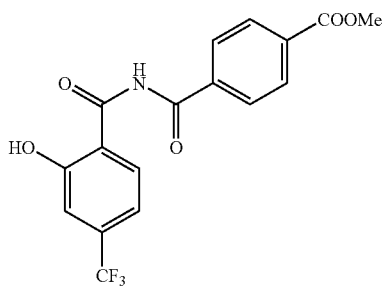

To 20.0 g of intermediate O were added 200 ml of acetonitrile and 6.9 g of sulfuric acid, followed by stirring at 90° C. for 4 hours. To the reaction mixture was added 80 ml of triethylamine, followed by cooling to room temperature. The resulting solid was collected by filtration and washed with water to give 18.4 g (97%) of intermediate P of formula:

(Synthetic intermediate P)

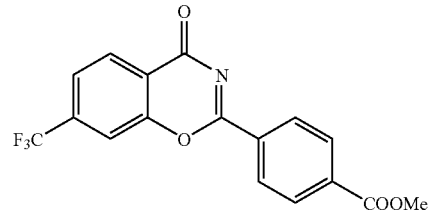

To 2.3 g of benzamidine hydrochloride were added 100 ml of methanol and 3.4 g of a 28% solution of sodium methoxide in methanol to make a solution, and 5.0 g of intermediate P was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 5.9 g (91%) of title compound (81).

MS: m/z 452 (M+)

Synthesis Example 14

Preparation of Compound (90)

To 20.0 g of 2-hydroxy-5-methoxybenzamide were added 80 ml of acetonitrile and 36.4 g of DBU to make a solution. To the solution was added 23.8 g of methyl 4-(chloroformyl)benzoate, followed by stirring at room temperature for 24 hours. To the reaction mixture were added 100 ml of water and 20 ml of hydrochloric acid. The resulting solid was collected by filtration and washed with water to furnish 38.0 g (96%) of intermediate Q of formula:

(Synthetic intermediate Q)

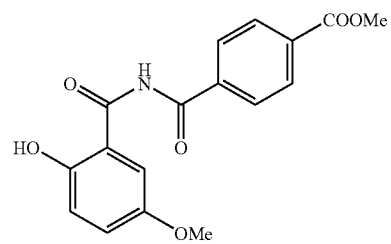

To 20.0 g of intermediate Q were added 200 ml of acetonitrile and 8.9 g of sulfuric acid, followed by stirring at 90° C. for 4 hours. To the reaction mixture was added 80 ml of triethylamine, followed by cooling to room temperature. The resulting solid was collected by filtration and washed with water to give 18.1 g (96%) of intermediate R of formula:

(Synthetic intermediate R)

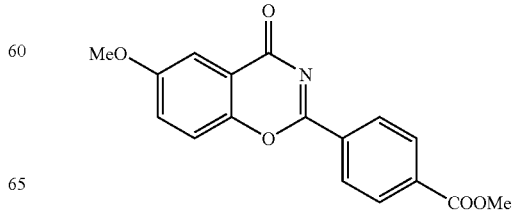

To 2.8 g of benzamidine hydrochloride were added 100 ml of methanol and 3.4 g of a 28% solution of sodium methoxide in methanol to make a solution, and 5.0 g of intermediate R was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 6.2 g (93%) of title compound (90).

MS: m/z 414 (M+)

Synthesis Example 15

Preparation of Compound (93)

To 20.0 g of 2-hydroxy-5-chlorobenzamide were added 80 ml of acetonitrile and 35.4 g of DBU to make a solution. To the solution was added 23.1 g of methyl 4-(chloroformyl)benzoate, followed by stirring at room temperature for 24 hours. To the reaction mixture were added 100 ml of water and 20 ml of hydrochloric acid. The resulting solid was collected by filtration and washed with water to furnish 38.1 g (98%) of intermediate S of formula:

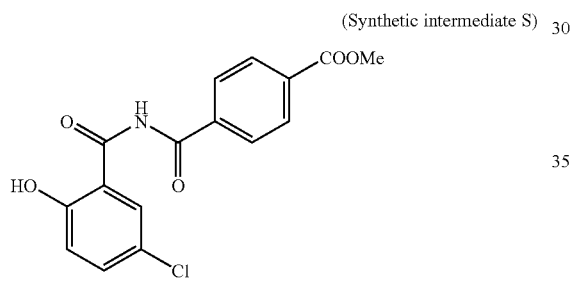
(Synthetic intermediate S)

To 20.0 g of intermediate S were added 200 ml of acetonitrile and 9.0 g of sulfuric acid, followed by stirring at 90° C. for 4 hours. To the reaction mixture was added 80 ml of triethylamine, followed by cooling to room temperature. The resulting solid was collected by filtration and washed with water to give 18.3 g (97%) of intermediate T of formula:

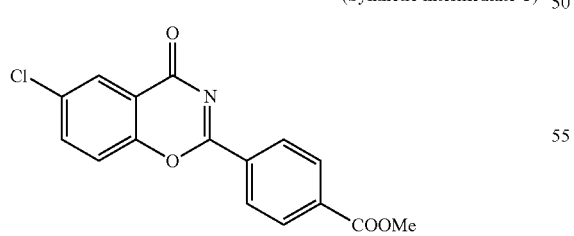
(Synthetic intermediate T)

To 2.5 g of benzamidine hydrochloride were added 100 ml of methanol and 3.3 g of a 28% solution of sodium methoxide in methanol to make a solution, and 5.0 g of intermediate T was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 6.1 g (92%) of title compound (93).

MS: m/z 418 (M+)

Synthesis Example 16

Preparation of Compound (96)

To 20.0 g of 2-hydroxy-3-methoxybenzamide were added 80 ml of acetonitrile and 36.4 g of DBU to make a solution. To the solution was added 23.8 g of methyl 4-(chloroformyl)benzoate, followed by stirring at room temperature for 24 hours. To the reaction mixture were added 100 ml of water and 20 ml of hydrochloric acid. The resulting solid was collected by filtration and washed with water to furnish 37.8 g (95%) of intermediate U of formula:

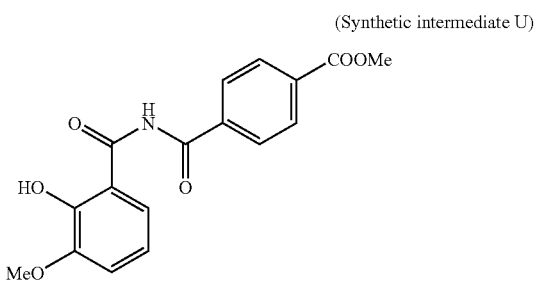
(Synthetic intermediate U)

To 20.0 g of intermediate U were added 200 ml of acetonitrile and 8.9 g of sulfuric acid, followed by stirring at 90° C. for 4 hours. To the reaction mixture was added 80 ml of triethylamine, followed by cooling to room temperature. The resulting solid was collected by filtration and washed with water to give 17.7 g (94%) of intermediate V of formula:

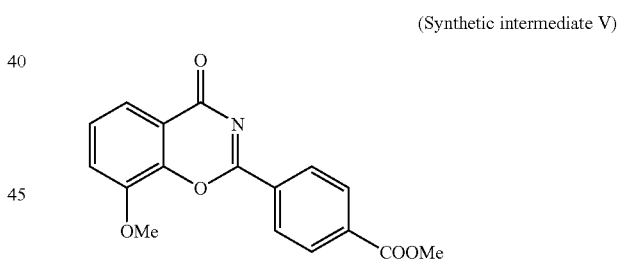
(Synthetic intermediate V)

To 2.8 g of benzamidine hydrochloride were added 100 ml of methanol and 3.4 g of a 28% solution of sodium methoxide in methanol to make a solution, and 5.0 g of intermediate V was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 6.5 g (98%) of title compound (96).

MS: m/z 414 (M+)

Synthesis Example 17

Preparation of Compound (107)

To 20.0 g of 3-hydroxy-2-naphthamide were added 80 ml of acetonitrile and 32.4 g of DBU to make a solution. To the solution was added 21.2 g of methyl 4-(chloroformyl)benzoate, followed by stirring at room temperature for 24 hours.

To the reaction mixture were added 100 ml of water and 20 ml of hydrochloric acid. The resulting solid was collected by filtration and washed with water to furnish 35.1 g (94%) of intermediate W of formula:

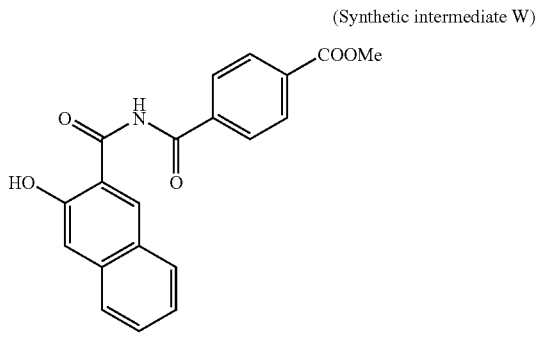

(Synthetic intermediate W)

To 20.0 g of intermediate W were added 200 ml of acetonitrile and 9.1 g of sulfuric acid, followed by stirring at 90° C. for 4 hours. To the reaction mixture was added 80 ml of triethylamine, followed by cooling to room temperature. The resulting solid was collected by filtration and washed with water to give 17.9 g (94%) of intermediate X of formula:

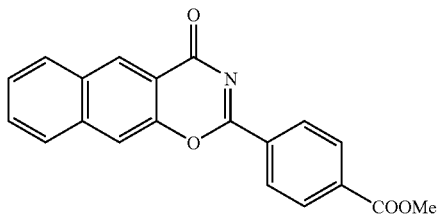

(Synthetic intermediate X)

To 2.3 g of benzamidine hydrochloride were added 100 ml of methanol and 3.0 g of a 28% solution of sodium methoxide in methanol to make a solution, and 5.0 g of intermediate X was added thereto, followed by stirring at 60° C. for 3 hours. After cooling to room temperature, 0.2 ml of hydrochloric acid was added to the reaction mixture. The solid thus formed was collected by filtration and washed successively with water and methanol to yield 6.1 g (94%) of title compound (107).

MS: m/z 434 (M+)

Preparation of UV Absorber Composition:

A PMMA resin (Dianal BR-80 from Mitsubishi Rayon Co., Ltd.) was dissolved in methylene chloride in a concentration of 22% by mass to prepare a binder solution. In the binder solution were dissolved 0.4 mass % of compound (1) and 0.1 mass % of the benzoxazinone compound of formula (II) as a UV absorber having an absorption wavelength at 340 to 400 nm to prepare a UV absorber composition, numbered 1.

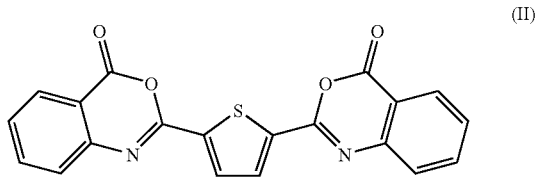

(II)

Making and Evaluation of Polymer Film:

UV absorber composition 1 was applied to a glass substrate using a blade set at a gap of 200 μm and dried at 100° C. for 10 minutes to form a 50 μm thick film.

By a similar method there were also prepared UV absorber compositions numbered 2 through 18 using compound (2), compound (3), compound (4), compound (5), compound (29), compound (32), compound (63), compound (64), compound (65), compound (75), compound (80), compound (81), compound (90), compound (93), compound (96), compound (107), and comparative compound (Tinuvin 1577FF, shown later), and film was made from each of the compositions 2 to 18.

The absorbance of the resulting films was measured with a spectrophotometer UV-3600 from Shimadzu Corp. Each film was irradiated with light from a metal halide lamp (Eye Super UV Tester from Iwasaki Electric Co., Ltd.) at an illuminance of 90 mW/cm$^2$, a temperature of 63° C., and a humidity of 50% for 400 hours. The retention of the UV absorber having an absorption wavelength at 340 to 400 nm after the 400 hour-irradiation was calculated according to the following formula.

Retention(%)=100×(100−transmittance after irradiation)/(100−transmittance before irradiation)

The transmittance was measured at 400 nm. The results obtained are shown in Table 1.

TABLE 1

| Composition No. | Compound | Retention (%) | Remark |
|---|---|---|---|
| 1 | compound (1) | 93 | invention |
| 2 | compound (2) | 94 | invention |
| 3 | compound (3) | 92 | invention |
| 4 | compound (4) | 90 | invention |
| 5 | compound (5) | 91 | invention |
| 6 | compound (29) | 93 | invention |
| 7 | compound (32) | 93 | invention |
| 8 | compound (63) | 95 | invention |
| 9 | compound (64) | 95 | invention |
| 10 | compound (65) | 93 | invention |
| 11 | compound (75) | 97 | invention |
| 12 | compound (80) | 93 | invention |
| 13 | compound (81) | 93 | invention |
| 14 | compound (90) | 91 | invention |
| 15 | compound (93) | 94 | invention |
| 16 | compound (96) | 90 | invention |
| 17 | compound (107) | 92 | invention |
| 18 | comparative compound | 33 | comparison |

Comparative Compound (Tinuvin 1577FF):

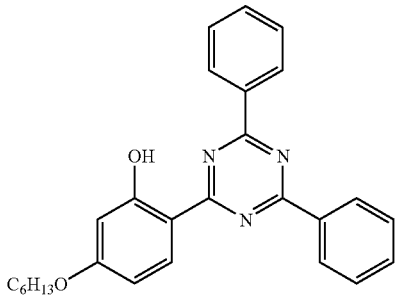

As is apparent from the results in Table 1, the resin compositions containing the compound (I) of the invention provide films having a higher retention of the UV absorber having an absorption at a wavelength of 340 to 400 nm than the resin composition containing the comparative compound, an existing UV absorber having an absorption in the UV-A region. That is, the UV absorber having an absorption at a wavelength of 340 to 400 nm in the resin compositions of the invention is protected from decomposition by irradiation.

What is claimed is:

1. An ultraviolet absorber composition comprising: a compound represented by formula (I); and an ultraviolet absorber having a maximum absorption at a wavelength of from 340 to 400 nm:

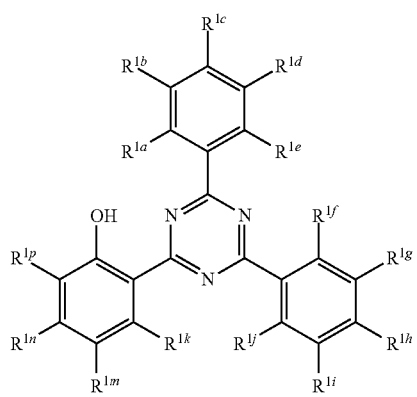

wherein $R^{1a}$, $R^{1b}$, $R^{1d}$, $R^{1e}$, $R^{1f}$, $R^{1g}$, $R^{1h}$, $R^{1i}$, and $R^{1j}$ each independently represent a hydrogen atom or a monovalent substituent except OH, $R^{1c}$ is selected from the group consisting of $COOR^r$, $CONR^s{}_2$, CN, $CF_3$, halogen, $NO_2$, $SO_2R^t$, and $SO_3M$ wherein $R^r$, $R^s$ and $R^t$ each independently represent a hydrogen atom or a monovalent substituent and M is a hydrogen atom or alkali metal, and wherein adjacent two of $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ may be taken together to form a ring; $R^{1k}$, $R^{1m}$, $R^{1n}$, and $R^{1p}$ each independently represent a hydrogen atom or a monovalent substituent, or adjacent two of $R^{1k}$, $R^{1m}$, $R^{1n}$, and $R^{1p}$ may be taken together to form a ring; and $R^{1h}$ is a substituent having a positive σp value in Hammett equation.

2. The ultraviolet absorber composition according to claim 1, wherein at least one of $R^{1a}$, $R^{1b}$, $R^{1c}$, $R^{1d}$, and $R^{1e}$ is a substituent having a positive σp value in Hammett equation.

3. The ultraviolet absorber composition according to claim 1, wherein $R^{1C}$ is a substituent having a positive σp value in Hammett equation.

4. The ultraviolet absorber composition according to claim 1, wherein the positive σp value in Hammett equation is from 0.1 to 1.2.

5. The ultraviolet absorber composition according to claim 1, wherein the substituent having a positive σp value in Hammett equation is a group selected from $COOR^r$, $CONR^s{}_2$, CN, $CF_3$, a halogen atom, $NO^2$, $SO_2R^t$, and $SO_3M$, wherein $R^r$, $R^s$, and $R^t$ each represent a hydrogen atom or a monovalent substituent and M represents a hydrogen atom or an alkali metal.

6. The ultraviolet absorber composition according to claim 1, wherein the substituent having a positive σp value in Hammett equation is $COOR^r$, wherein $R^r$ represents a hydrogen atom or a monovalent substituent.

7. The ultraviolet absorber composition according to claim 1, wherein $R^{1c}$ is CN.

8. The ultraviolet absorber composition according to claim 1, wherein $R^{1n}$ is $OR^u$, wherein $R^u$ represents a hydrogen atom or a monovalent substituent.

9. The ultraviolet absorber composition according to claim 8, wherein $R^u$ is an alkyl group having 1 to 20 carbon atoms.

10. The ultraviolet absorber composition according to claim 1, wherein the ultraviolet absorber having a maximum absorption at a wavelength of from 340 to 400 nm is at least one compound selected from a benzotriazole compound, a benzophenone compound, a benzoxazinone compound, a cyanoacrylate compound, a benzoxazole compound, a merocyanine compound, and a triazine compound.

11. The ultraviolet absorber composition according to claim 1, wherein the ultraviolet absorber having a maximum absorption at a wavelength of from 340 to 400 nm is a benzoxazinone compound.

12. A resin composition comprising: a compound represented by formula (I); and an ultraviolet absorber having a maximum absorption at a wavelength of from 340 to 400 nm:

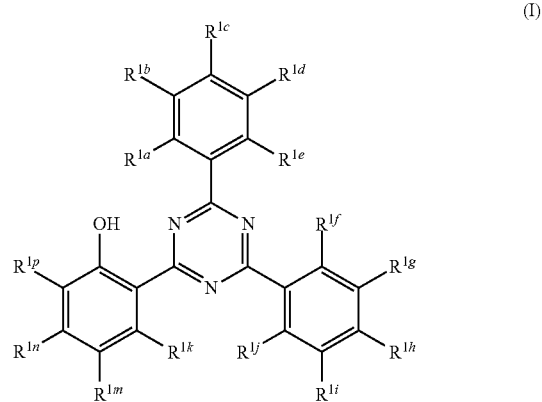

wherein $R^{1a}$, $R^{1b}$, $R^{1d}$, $R^{1e}$, $R^{1f}$, $R^{1g}$, $R^{1h}$, $R^{1i}$, and $R^{1j}$ each independently represent a hydrogen atom or a monovalent substituent except OH, $R^{1c}$ is selected from the group consisting of $COOR^r$, $CONR^s{}_2$, CN, $CF_3$, halogen, $NO_2$, $SO_2R^t$, and $SO_3M$ wherein $R^r$, $R^s$ and $R^t$ each independently represent a hydrogen atom or a monovalent substituent and M is a hydrogen atom or alkali metal, and wherein adjacent two of $R^{1a}$, $R^{1b}$, $R^{1c}$, $R^{1d}$, $R^{1e}$, $R^{1f}$, $R^{1g}$, $R^{1h}$, $R^{1i}$, and $R^{1j}$ may be taken together to form a ring; $R^{1k}$, $R^{1m}$, $R^{1n}$, and $R^{1p}$ each independently represent a hydrogen atom or a monovalent substituent, or adjacent two of $R^{1k}$, $R^{1m}$, $R^{1n}$, and $R^{1p}$ may be taken together to form a ring; and $R^{1h}$ is a substituent having a positive σp value in Hammett equation.

* * * * *